United States Patent
Nakagawa et al.

(10) Patent No.: US 9,549,192 B2
(45) Date of Patent: *Jan. 17, 2017

(54) MOTION PICTURE ENCODING DEVICE AND MOTION PICTURE DECODING DEVICE

(71) Applicant: FUJITSU LIMITED, Kawasaki-shi, Kanagawa (JP)

(72) Inventors: Akira Nakagawa, Kawasaki (JP); Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,744

(22) Filed: Jan. 13, 2016

(65) Prior Publication Data

US 2016/0127735 A1    May 5, 2016

Related U.S. Application Data

(63) Continuation of application No. 14/472,616, filed on Aug. 29, 2014, which is a continuation of application (Continued)

(30) Foreign Application Priority Data

Sep. 6, 2002  (JP) .................................. 2002-261427
Aug. 7, 2003  (JP) .................................. 2003-289350

(51) Int. Cl.
    H04N 7/12       (2006.01)
    H04N 19/186     (2014.01)
    (Continued)

(52) U.S. Cl.
    CPC .......... *H04N 19/186* (2014.11); *H04N 19/105* (2014.11); *H04N 19/139* (2014.11);
    (Continued)

(58) Field of Classification Search
    CPC .. H04N 19/105; H04N 19/139; H04N 19/159; H04N 19/16; H04N 19/176; H04N 19/186; H04N 19/51; H04N 19/513; H04N 19/52; H04N 19/521; H04N 19/61
    See application file for complete search history.

(56) References Cited

U.S. PATENT DOCUMENTS

5,604,539 A    2/1997  Ogasawara et al. .......... 348/396
5,905,542 A    5/1999  Linzer
(Continued)

FOREIGN PATENT DOCUMENTS

EP    0 863 675    9/1998
EP    0 955 607    11/1999
(Continued)

OTHER PUBLICATIONS

Thomas Wiegand, "Joint Final Committee Draft (JFCD) of Joint Video Specification (ITU-T REC. H.264 I ISO/IEC 14496-10 AVC)" Joint Video Team (JVT) of IDS/TEC MPEG and ITU-T VCEG DFAFT ISO/IEC 14496-10: 2002 pp. 1-191.
(Continued)

*Primary Examiner* — Nhon Diep
(74) *Attorney, Agent, or Firm* — Staas & Halsey LLP

(57) ABSTRACT

When a prediction is made between fields with different parity, the predicative efficiency of a chrominance vector is improved by adaptively switching the generation of a chrominance motion vector depending on encoding/decoding field parity (top/bottom) and a reference field parity (top/bottom), and the coding efficiency is improved accordingly.

10 Claims, 24 Drawing Sheets

Related U.S. Application Data

No. 11/070,663, filed on Mar. 3, 2005, now Pat. No. 9,124,886, which is a continuation of application No. 10/655,397, filed on Sep. 5, 2003, now Pat. No. 8,068,542.

(51) Int. Cl.

| | | |
|---|---|---|
| *H04N 19/105* | (2014.01) | |
| *H04N 19/176* | (2014.01) | |
| *H04N 19/51* | (2014.01) | |
| *H04N 19/513* | (2014.01) | |
| *H04N 19/61* | (2014.01) | |
| *H04N 19/16* | (2014.01) | |
| *H04N 19/139* | (2014.01) | |
| *H04N 19/159* | (2014.01) | |
| *H04N 19/52* | (2014.01) | |

(52) U.S. Cl.
CPC ........... *H04N 19/159* (2014.11); *H04N 19/16* (2014.11); *H04N 19/176* (2014.11); *H04N 19/51* (2014.11); *H04N 19/513* (2014.11); *H04N 19/52* (2014.11); *H04N 19/521* (2014.11); *H04N 19/61* (2014.11)

(56) References Cited

U.S. PATENT DOCUMENTS

| | | | |
|---|---|---|---|
| 6,108,039 | A | 8/2000 | Linzer et al. |
| 6,310,919 | B1 | 10/2001 | Florencio |
| 6,501,799 | B1 | 12/2002 | Kohn |
| 6,519,005 | B2 | 2/2003 | Bakhmutsky et al. |
| 6,940,557 | B2 | 9/2005 | Handjojo et al. |
| 7,809,062 | B2 | 10/2010 | Nakagawa et al. |
| 7,826,532 | B2 | 11/2010 | Nakagawa et al. |
| 8,068,542 | B2 | 11/2011 | Nakagawa et al. |
| 8,509,307 | B2 | 8/2013 | Nakagawa et al. |
| 8,654,851 | B2 | 2/2014 | Nakagawa et al. |
| 8,660,184 | B2 | 2/2014 | Nakagawa et al. |
| 8,665,956 | B2 | 3/2014 | Nakagawa et al. |
| 8,665,957 | B2 | 3/2014 | Nakagawa et al. |
| 8,861,604 | B2 | 10/2014 | Nakagawa et al. |
| 2005/0111550 | A1 | 5/2005 | Wang et al. |

FOREIGN PATENT DOCUMENTS

| | | |
|---|---|---|
| JP | 6-189297 | 7/1994 |
| JP | 2001-238228 | 8/2001 |
| JP | 2004-40494 | 2/2004 |

OTHER PUBLICATIONS

Office Action for corresponding Chinese Application No. 03156610.3 dated Dec. 30, 2005.
European Search Report for corresponding application No. 03019607.5 dated Mar. 15, 2005.
Japanese Patent Office Notice of Rejection Grounds, mailed Dec. 20, 2005, and issued in corresponding Japanese Patent Application No. 2003-289350.
Canadian Patent Office Action mailed Jun. 19, 2006 for corresponding Canadian Patent Application No. 2,439,886.
Chinese Patent Office Action, mailed Apr. 25, 2008 and issued in corresponding Chinese Patent Application No. 200510130221.1.
Korean Office Action mailed on Oct. 29, 2008 and issued in corresponding Korean Patent Application No. 10-2003-0061675.
ITU-T "Transmission of Non-Telephone Signals", ITU-T Recommendation H.262 (Jul. 1995), section 6.1.1.8, "4:2:0 format".
Office Action mailed Feb. 4, 2010 in U.S. Appl. No. 11/070,661.
Office Action mailed Feb. 18, 2010 in U.S. Appl. No. 10/655,397.
"MPEG-4 Video Verification Model Version 7.0", ISO/IEC/JTC1/SC29/WG11, MPEG97/N1642, No. N1642, Apr. 1, 1997, pp. 1, 12-14, Apr. 1997.
Summons to attend oral proceedings (issued in corresponding European Patent Application No. 03 019 607.5) dated Mar. 16, 2010.
"Coding of Moving Pictures and Audio", International Organization for Standardization, ISO/IEC JTC1/SC29/WG11, pp. 8-9, 60-61, 63-64, Jul. 2002.
Notice of Allowance mailed Jul. 22, 2010, in U.S. Appl. No. 11/070,661.
Notice of Allowance mailed Jun. 25, 2010, in U.S. Appl. No. 11/070,479.
Office Action mailed Mar. 29, 2011, in U.S. Appl. No. 10/655,397.
Office Action mailed Feb. 2, 2010, in U.S. Appl. No. 11/070,479.
Notice of Allowance mailed Aug. 9, 2011 in U.S. Appl. No. 10/655,397.
Office Action mailed Sep. 14, 2011, in U.S. Appl. No. 11/694,359.
Office Action mailed Sep. 20, 2011, in U.S. Appl. No. 11/694,292.
Office Action mailed Dec. 7, 2011, in U.S. Appl. No. 12/752,399.
Office Action mailed Jan. 31, 2012, in U.S. Appl. No. 12/768,105.
Office Action mailed Jan. 31, 2012, in U.S. Appl. No. 12/768,109.
Office Action mailed Feb. 1, 2012, in U.S. Appl. No. 12/767,929.
Office Action mailed Feb. 13, 2012, in U.S. Appl. No. 12/414,127.
"Coding of Moving Pictures and Audio", International Organization for Standardization, ISO/IEC JTC1/SC29/WG11, pp. 1-206, Jul. 2002.
Office Action mailed Apr. 25, 2012, in U.S. Appl. No. 11/694,359.
Office Action mailed Apr. 25, 2012, in U.S. Appl. No. 11/694,292.
Office Action mailed Jun. 6, 2012, in U.S. Appl. No. 12/414,105.
Final Office Action mailed Aug. 15, 2012 in U.S. Appl. No. 12/752,399.
Final Office Action mailed Nov. 6, 2012, in U.S. Appl. No. 12/768,109.
Final Office Action mailed Nov. 9, 2012, in U.S. Appl. No. 12/768,105.
Final Office Action mailed Nov. 21, 2012, in U.S. Appl. No. 12/767,929.
Final Office Action mailed Dec. 6, 2012, in U.S. Appl. No. 12/414,127.
Final Office Action mailed Jan. 9, 2013, in U.S. Appl. No. 12/414,105.
Canadian Patent Office Action mailed Feb. 21, 2013, in corresponding Canadian Patent Application No. 2,779,486.
European Office Action dated Feb. 11, 2013 for corresponding European Patent Application No. 07011670.2.
European Office Action dated Feb. 14, 2013 for corresponding European Patent Application No. 07011666.0.
Notice of Allowance issued May 10, 2013 in U.S. Appl. No. 12/752,399.
Office Action issued May 23, 2013 in U.S. Appl. No. 12/768,109.
Office Action issued Jun. 6, 2013 in U.S. Appl. No. 12/414,127.
Office Action mailed Jun. 6, 2013 in U.S. Appl. No. 12/767,929.
Office Action issued Jul. 3, 2013 in U.S. Appl. No. 12/768,105.
Canadian Patent Office Action dated Aug. 13, 2013 for corresponding Canadian Patent Application No. 2,779,486.
ISO/IEC MPEG-2/MPEG-4, "Advanced Video Coding (AVC)", Joint Final Committee Draft (JFCD) of Joint Video Specification (ITU-T REC, H.264 ISO/IEC 14496-, JVT-D157), pages ISO/IEC JTC1/SO29/WG11MPEG02/N492, Klagenfurt, AT, Jul. 1, 2002.
Notice of Allowance issued Oct. 8, 2013 in U.S. Appl. No. 12/414,127.
Notice of Allowance issued Oct. 8, 2013 in U.S. Appl. No. 12/767,929.
Notice of Allowance issued Oct. 3, 2013 in U.S. Appl. No. 12/768,109.
Notice of Allowance issued Dec. 23, 2013 in related U.S. Appl. No. 12/768,105.
Notice of Allowance issued Jul. 18, 2014 in related U.S. Appl. No. 12/414,105.
Office Action issued Jul. 17, 2014 in related U.S. Appl. No. 11/694,292.
Office Action issued Jul. 18, 2014 in related U.S. Appl. No. 11/694,359.
Canadian Office Action issued Jul. 9, 2014 in corresponding Canadian Patent Application No. 2,779,486.

(56) References Cited

OTHER PUBLICATIONS

Office Action issued Jul. 31, 2014 in corresponding U.S. Appl. No. 11/070,663.
Office Action issued Feb. 19, 2010 in corresponding U.S. Appl. No. 11/070,663.
Office Action issued Jun. 9, 2009 in corresponding U.S. Appl. No. 11/070,663.
Interview Summary Record mailed May 11, 2009 in U.S. Appl. No. 11/070,479.
Office Action mailed Apr. 29, 2009 in U.S. Appl. No. 11/070,479.
Notice to File Missing Parts of Nonprovisional Application mailed Mar. 29, 2005 in U.S. Appl. No. 11/070,479.
Office Action mailed Jun. 9, 2009 in U.S. Appl. No. 11/070,663.
Office Action mailed May 27, 2009 in U.S. Appl. No. 10/070,661.
Office Action mailed Aug. 6, 2009 in U.S. Appl. No. 10/655,397.
Office Action mailed Feb. 23, 2009 in U.S. Appl. No. 10/655,397.
Office Action mailed May 30, 2008 in U.S. Appl. No. 10/655,397.
Office Action mailed Nov. 2, 2007 in U.S. Appl. No. 10/655,397.
Office Action mailed Feb. 23, 2007 in U.S. Appl. No. 10/655,397.
Office Action mailed Aug. 31, 2010, in U.S. Appl. No. 10/655,397.
Notice of Allowance issued Nov. 12, 2014 in related U.S. Appl. No. 11/694,359.
European Office Action issued Mar. 3, 2006 in corresponding European Patent Application No. 03 019 607.5.
Notice of Allowance issued Nov. 28, 2014 in related U.S. Appl. No. 11/694,292.
Notice of Allowance issued Feb. 4, 2015 in related U.S. Appl. No. 11/070,663.
Notice of Allowance issued Apr. 24, 2015 in related U.S. Appl. No. 11/070,663.
Notice of Allowance issued Jul. 20, 2015 in related U.S. Appl. No. 11/070,663.
U.S. Appl. No. 10/655,397, filed Sep. 5, 2003, Akira Nakagawa et al., Fujitsu Limited.
U.S. Appl. No. 11/070,479, filed Mar. 3, 2005, Akira Nakagawa et al., Fujitsu Limited.
U.S. Appl. No. 11/070,663, filed Mar. 3, 2005, Akira Nakagawa et al., Fujitsu Limited.
U.S. Appl. No. 11/070,661, filed Mar. 3, 2005, Akira Nakagawa et al., Fujitsu Limited.
U.S. Appl. No. 11/694,359, filed Mar. 30, 2007, Akira Nakagawa et al., Fujitsu Limited.
U.S. Appl. No. 11/694,292, filed Mar. 30, 2007, Akira Nakagawa et al., Fujitsu Limited.
U.S. Appl. No. 12/414,105, filed Mar. 30, 2009, Akira Nakagawa et al., Fujitsu Limited.
U.S. Appl. No. 12/414,127, filed Mar. 30, 2009, Akira Nakagawa et al., Fujitsu Limited.
U.S. Appl. No. 12/752,399, filed Apr. 1, 2010, Akira Nakagawa et al., Fujitsu Limited.
U.S. Appl. No. 12/767,929, filed Apr. 27, 2010, Akira Nakagawa et al., Fujitsu Limited.
U.S. Appl. No. 12/768,105, filed Apr. 24, 2010, Akira Nakagawa et al., Fujitsu Limited.
U.S. Appl. No. 12/768,109, filed Apr. 27, 2010, Akira Nakagawa et al., Fujitsu Limited.
U.S. Appl. No. 14/833,616, filed Aug. 24, 2015, Akira Nakagawa et al., Fujitsu Limited.
U.S. Appl. No. 14/472,616, filed Aug. 29, 2014, Akira Nakagawa et al., Fujitsu Limited.
Office Action issued Apr. 1, 2016 in related U.S. Appl. No. 14/472,616.
Notice of Allowance issued Jun. 13, 2016 in related U.S. Appl. No. 14/472,616.
Office Action issued May 6, 2016 in related U.S. Appl. No. 14/833,616.
Notice of Allowance issued Oct. 12, 2016 in related U.S. Appl. No. 14/833,616.

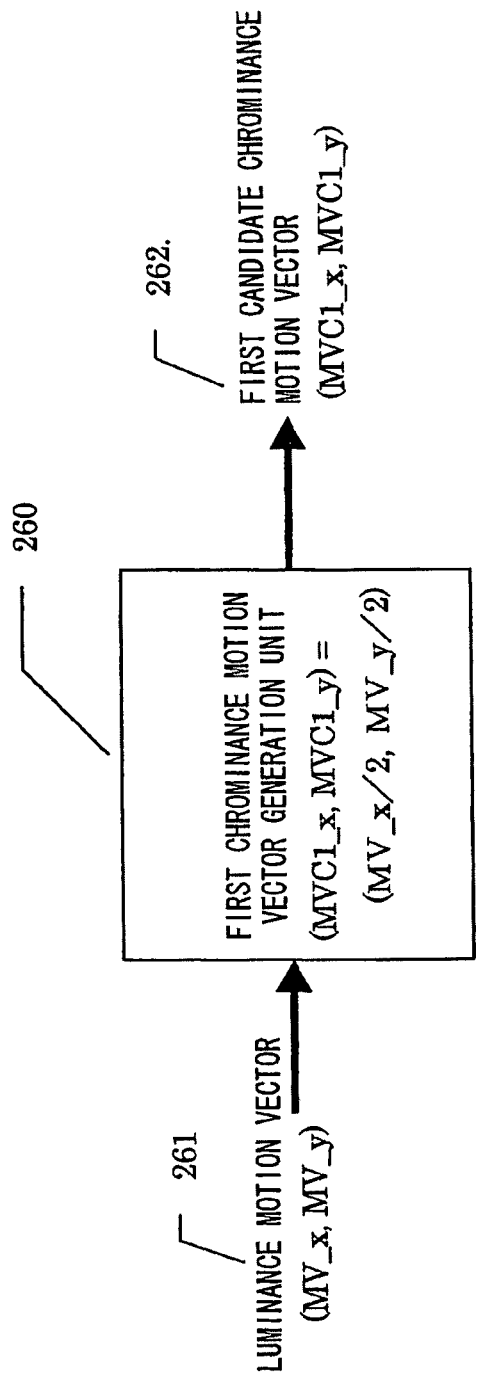
F I G. 16

MOTION PICTURE ENCODING DEVICE AND MOTION PICTURE DECODING DEVICE

CROSS-REFERENCE TO RELATED APPLICATION

This application is a Continuation of application Ser. No. 14/472,616 filed Aug. 29, 2014, which is a Continuation of application Ser. No. 11/070,663 filed Mar. 3, 2005, which is a Divisional of application Ser. No. 10/655,397 filed Sep. 5, 2003, which is based upon and claims the benefit of priority of the prior Japanese Patent Application No. 2002-261427, filed on Sep. 6, 2002, and Japanese Patent Application No. 2003-289350 filed on Aug. 7, 2003, the entire contents of which are incorporated herein by reference.

BACKGROUND OF THE INVENTION

Field of the Invention

The present invention relates to a motion picture encoding device and a motion picture decoding device, which have an inter-field prediction mode.

Description of the Related Art

Generally, motion picture data is large in size. Therefore, when motion picture data is transmitted from a transmitting device to a receiving device or when it is stored in a storage device, highly efficient encoding is applied to motion picture data. In this case, "highly efficient encoding" is an encoding process of converting a specific data string into another data string, and compressing the amount of data.

There are two types of motion picture data: one is mainly composed of only frames and the other is composed of fields. A prior art for compressing a field image is mainly described below.

As the highly efficient encoding method of motion picture data, a frame/field prediction encoding is known.

FIG. 1 shows a block diagram of the configuration of the frame/field predictive encoding device.

This encoding method utilizes the fact that a plurality of segments of motion picture data has high correlation in a time direction with each other. The operation shown in FIG. 1 is roughly described below. A subtracter 39 generates a differential image between an inputted original image and a predicted image, and an orthogonal transform unit 31, a quantization unit 32 and a coefficient entropy encoding unit 40 encode the differential image. An inverse quantization unit 33 and an inverse orthogonal transform unit 34 reproduce the differential image from the output of the quantization unit 32. Then, a decoded image generation unit 35 decodes the encoded image using the reproduced differential image reproduced by the decoded image generation unit 35 and the predicted image used at the time of encoding. A decoded image storage unit 36 stores the reproduced image. Then, motion vector calculation unit 37 calculates a motion vector between the reproduced image and a subsequent input image, and a predicted image generation unit 38 generates a predicted image using the motion vector. The generated motion vector is encoded by a vector entropy encoding unit 41 and is outputted through a MUX 42 together with the encoded coefficient data encoded by the coefficient entropy encoding unit 40. In other words, since in motion picture data, there is generally high similarity between frame/field data at a specific time and frame/field data at a subsequent time, the inter-frame/field predictive encoding method utilizes such a property. For example, in a data transmission system adopting the inter-frame/field predictive encoding method, a transmitting device generates motion vector data indicating displacement from previous frame/field image to a target frame/field image, and differential data between a predicted image in the target frame/field which is generated from the previous frame/field image using its motion vector data and a real image in the target frame/field, and transmits the motion vector data and the differential data to a receiving device. The receiving device reproduces the image in the target frame/field from the received motion vector data and differential data.

So far, the summary of the frame/field predictive encoding has been described with reference to FIG. 1. Next, frame predictive encoding and field predictive encoding are described below.

FIGS. 2 and 3 show a format used to encode a field image that is commonly used in ISO/IEC MPEG-2/MPEG-4 (hereinafter called "MPEG-2" and "MPEG-4", respectively) and the final committee draft of ITU-T H.264/ISO/IEC MPEG-4 Part 10 (Advanced video coding (AVC)) ("Joint Final Committee Draft (JFCD) of Joint Video Specification (ITU-T REC, H.264|ISO/IEC 14496-10 AVC)", JVT-D157, or ISO/IEC JTC1/SO29/WG11 MPEG02/N492, July 2002, Klagenfurt, AT) (hereinafter called "AVC FCD"), which ITU-T and ISO/IEC jointly were standardizing as of August 2002. Specifically, each frame is composed of two fields: a top field and a bottom field. FIG. 2 shows the respective positions of a luminance pixels and a chrominance pixels, and a field to which each pixel belongs. As shown in FIG. 2, odd number-ordered luminance lines, such as a first luminance line (50a), a third luminance line (50b), a fifth luminance line (50c), a seventh luminance line (50d), etc., belong to the top field, and even number-ordered lines, such as a second luminance line (51a), a fourth luminance line (51b), a sixth luminance line (51c), a eighth luminance line (51d), etc., belong to the bottom field. Similarly, odd number-ordered chrominance lines, such as a first chrominance line (52a), a third chrominance line (52b), etc., belong to the top field, and even number-ordered chrominance line, such as a second chrominance (53a), a fourth chrominance line, etc., belong to the bottom field.

Each of the top and bottom fields indicates an image at a different time. Next, the time/spatial disposition of the top and bottom fields is described with reference to FIG. 3.

In FIG. 3 and after, the technology of the present invention relates to the vertical component of a motion vector. Therefore, in this specification, horizontal pixel components are not shown, and all the horizontal components of the motion vector are assumed to be 0 for convenience sake. However, in order to show conventional problems and the effects of the present invention, the positional relation between luminance and chrominance in each field is accurately shown.

In FIG. 3, the vertical and horizontal axes represent the pixel position of a vertical component in each field and the elapse of time, respectively. Since there is no positional change in a field of the horizontal component of each image, in FIG. 3, its horizontal pixel component is not shown nor is described.

As shown in FIG. 3, the pixel position of a chrominance component deviates from the pixel position in a field of a luminance component by a quarter vertical pixel. This is because relationship of pixel positions as shown in FIG. 2 is achieved when a frame is constructed from both Top and Bottom fields. If it is based on a NTSC format, each time interval between adjacent top and bottom fields (64a: 65a, 65a: 64b, etc.) is approximately 1/60 seconds. Each time interval between two consecutive top fields (64*a*: 64*b*, etc.) or between two consecutive bottom field (65*a*: 65*b*, etc.) are approximately ⅟₃₀ seconds.

Next, the frame predictive encoding mode of a field image and its field prediction, which is adopted in MPEG-2 and AVC FCD, are described.

FIG. 4 shows a method for constructing a frame using two consecutive fields (adjacent top and bottom fields) in a frame predictive mode.

As shown in FIG. 4, a frame is reconstructed by two time-consecutive fields (top and bottom fields).

FIG. 5 shows a frame predictive mode.

In FIG. 5 it is assumed that each frame, such as 84*a*, 84*b*, 84*c*, etc., is already reconstructed by two consecutive fields (top and bottom fields), as shown in FIG. 4. In this frame predictive mode, a frame to be encoded which is composed of top and bottom fields is encoded. As a reference image, one reference frame is constructed by two consecutive fields (top and bottom fields) stored for reference use, and is used to predict the target frame to be encoded. Then, these two frame images are encoded according to the process flow shown in FIG. 1. In the expression method of a motion vector of this frame predictive encoding mode, a zero vector, that is, (0,0) indicates a pixel located in the same spatial position. Specifically, the motion vector (0, 0) of a luminance pixel 82 that belongs to frame #2 (84*b*) indicates the pixel position 81 of frame #1 (84*a*).

Next, a field predictive encoding mode is described.

FIG. 6 shows a predictive method in an inter-field predictive mode.

In a field predictive mode, an encoding target is one top field (94*a*, 94*b*, etc.) or bottom field (95*a*, 95*b*, etc.) that is inputted as an original image. As a reference image, a top field or bottom field that is stored before can be used. In this case, it is generally defined that the fact that an original image field parity and a reference field parity are the same means that the original image field and the reference field both are top fields or bottom fields. For example, in a prediction 90 between fields with the same parity shown in FIG. 6, an original image field (94*b*) and a reference field (94*a*) both are top fields. Similarly, it is generally defined that the fact that an original image field parity and a reference field parity are different means that one of original image and reference fields is a top field and the other is a bottom field. For example, in a prediction 91 between different parity fields shown in FIG. 6, the original image field is a bottom field (95*a*) and the reference field is a top field (94*a*). Then, these original image and reference fields are encoded according to the process flow shown in FIG. 1.

In the prior art, in both frame and field modes, a motion vector is calculated based on a pixel position in each frame/field. Here, a conventional motion vector calculation method and a conventional pixel corresponding method used when a motion vector is given are described.

FIG. 7 defines the coordinates of a frame/field image widely used in MPEG-2 coding, MPEG-1 coding, AVC FCD coding, etc. White circles in FIG. 7 are pixel definition positions in target frames/fields. In the coordinates of this frame/field image, the upper left corner is designated as the origin (0,0), and values 1, 2, 3, etc., are sequentially assigned to both horizontal and vertical pixel definition positions. Specifically, the coordinates of a pixel that are located at the n-th horizontal position and the m-th vertical position are (n,m). Similarly, the coordinates of a position interpolated among the pixels are also defined. Specifically, since a position 180 marked with a black circle in FIG. 7 is located at 1.5 pixels in the horizontal direction from the pixel located in the upper left corner and at 2 pixels in the vertical direction, the coordinates of the position 180 is expressed as (1.5, 2). In a field image, there are only a half of the pixels of a frame image in the vertical direction. However, even in this case, the coordinates of a pixel are defined in the same way as in FIG. 7, based on pixel positions located in each field.

Next, the definition of a motion vector between fields is described using the coordinate system shown in FIG. 7.

FIG. 8 shows a conventional calculation method of a motion vector between corresponding pixels between fields. The definition of a motion vector requires the position of a coding field and the position of a reference field. A motion vector is defined between these two points. Thus, a motion vector between a coding field coordinates 201 ($X_s$, $Y_s$) and a reference field coordinates 202 ($X_d$, $Y_d$) is calculated. In the conventional calculation method of a motion vector between pixels corresponding to between-fields, a motion vector is calculated by the same method described below, regardless of whether the coding field or reference field is a top field or a bottom field. Specifically, coding field coordinates 201 ($X_s$, $Y_s$) and reference field coordinates 202 ($X_d$, $Y_d$) are inputted to a motion vector calculation unit 200, and as a motion vector 203 between these two points, ($X_d-X_s$, $Y_d-Y_s$) is given.

FIG. 9 shows a conventional method for calculating a pixel that is pointed by a motion vector defined between fields. In this case, it is assumed that a motion vector is calculated by the method shown in FIG. 8. The calculation of reference frame/field coordinates requires a coding frame/field position and a motion vector. In the case shown in FIG. 9, it is assumed that a motion vector 211 (X,Y) is given for coding field coordinates 212 ($X_s$, $Y_s$), and reference field coordinates can be calculated using both the motion vector 212 (X,Y) and the coding field coordinates 212 ($X_s$, $Y_s$). In the conventional calculation method of a motion vector between corresponding pixels between fields, a reference field position is calculated by the same method described below, regardless of whether the coding field or reference field is a top field or a bottom field. Specifically, a motion vector 211 (X,Y) and coding field coordinates 212 ($X_s$, $Y_s$) are inputted to a pixel corresponding unit 210, and as reference field coordinates 213, coordinates ($X_s+X$, $Y_s+Y$) is given.

The definition of the relation between a vector and a pixel position applies to both a luminance component and chrominance component. In MPEG-1/MPEG-2/AVC FCD, which all are general motion picture encoding methods, only the vector of a luminance component is encoded, and the vector of a chrominance component is calculated by scaling down the luminance component. Particularly, in AVC FCD, since the number of vertical pixels and that of horizontal pixels of a chrominance component are a half of those of a luminance component, respectively, it is specified that a motion vector used to calculate the predictive pixel of a chrominance component should be obtained by accurately scaling down the motion vector of the luminance component to a half.

FIG. 10 shows a conventional method for calculating a chrominance motion vector using a luminance motion vector.

Specifically, if a luminance motion vector 221 and a chrominance motion vector 222 are (MV_x, MV_y) and (MVC_x, MVC_y), respectively, a chrominance motion vector generation unit 220 can calculate a chrominance motion vector 222 according to the following equation.

$$(MVC\_x, MVC\_y) = (MV\_x/2, MV\_y/2) \quad (1)$$

This conventional calculation method can be used regardless of whether a motion vector is used for prediction between fields with the same parity or between fields with different parity.

In AVC FCD, as the accuracy of the motion vector of a luminance component, ¼ pixel accuracy can be applied. Therefore, as a result of equation (1), as the accuracy of the motion vector of a chrominance component, a vector having ⅛ pixel accuracy, that is, accuracy at the decimal fraction, can be used.

FIG. 11 shows the calculation method of the interpolated pixel of a chrominance component that is defined in AVC FCD.

In FIG. 11, a black circle and a white circle represent an integer pixel and an interpolated pixel, respectively. In this case, the horizontal coordinate of an interpolated pixel G(256) is obtained by internally dividing each horizontal coordinate between points A(250) and C(252) at a ratio $\alpha:1-\alpha$, and the vertical coordinate can be obtained by internally dividing each vertical coordinate between points A(250) and B(251) at $\beta:1-\beta$. In this case, a and P are a value between 0 and 1. An interpolated pixel G(256) defined by such positions can be roughly calculated as follows using integer pixels A(250), B(251), C(252) and D(253), which are located around the interpolated pixel G(256), and using $\alpha$ and $\beta$.

$$G=(1-\alpha)\cdot(1-\beta)\cdot A+(1-\alpha)\cdot\beta\cdot\beta+\alpha(1-\beta)\cdot C+\alpha\cdot\beta\cdot D \qquad (2)$$

The interpolated pixel calculation method of a chrominance component, using the method shown in FIG. 11 is just one example, and there is no problem in using another calculation method.

In the case of this field encoding mode, in a prediction in which an original image field and a reference field are different, that is, between fields with different parity, the respective zero vectors of the motion vector of a luminance component and that of a chrominance component are not parallel in the definition of AVC FCD. Specifically, if a prediction is made using the motion vector of a chrominance component calculated using the motion vector of a luminance component according to the conventional definition, a pixel located in a position spatially deviated from that of the luminance component is to be referenced. This fact is described below with reference to FIG. 12. In FIG. 12, it is assumed that a top field 130, a bottom field 131 and a top field 132 continue timewise. In this case, bottom field 131 is to be encoded using top field 130. In this inter-field encoding, the vertical motion vector in the same line of each field is defined to be zero. Therefore, if a zero vector (0, 0) is assigned to a luminance pixel 133*a* that belongs to the second line of bottom field 131, this pixel can be predicted from a pixel 135*a* in top field 130. Similarly, when a zero vector (0, 0) is assigned to a chrominance pixel 133*a* which belongs to the first line of the bottom field 131, this pixel is predicted from the pixel 137*a* which is in the first line of chrominance of the top field 130. Similarly, a luminance pixel 133*b* in the third line and a chrominance pixel 134*b*, which belong to top field 132 are predicted from pixels 135*b* in the third line of luminance and 137*b* in the second line of chrominance in bottom field 131, respectively. Since essentially it is preferable that a chrominance motion vector and a luminance motion vector are parallel, chrominance pixels 134*a* and 134*b* should be predicted from the positions 136*a* and 136*b*, respectively, if a luminance motion vector is as it is.

As described earlier, in a prediction between fields with different parity, the fact that the respective zero vectors of luminance and chrominance are not parallel is explained. In the case of AVC FCD, this fact causes the following problems for all vectors in a prediction between fields with different parity. FIGS. 13 and 14 show such problems. Problems in the case of AVC FCD are described below. In the explanation below, a horizontal component of a motion vector is set to zero in all cases for brevity.

FIG. 13 shows a conventional problem caused if a chrominance motion vector is conventionally calculated using a luminance motion vector when a reference field and a coding field are a bottom field and a top field, respectively. In AVC FCD, since, as is clear from equation (1), it is specified that the number of vertical and horizontal pixels of a chrominance component are a half of those of a luminance component, a motion vector used to calculate the predictive pixel of a chrominance should be scaled down to a half of the motion vector of a luminance component. This is regardless of whether a motion vector is used for prediction between frames, between fields with the same parity or between fields with different parity.

It is shown below that this definition causes a problem when a chrominance motion vector is calculated using a luminance motion vector defined between fields with different parity. In FIG. 13, a coding field top field luminance pixel 140 in the first line has (0,1) as a predictive vector, and as a result, it points a bottom reference field luminance pixel position 141 in the second line as a predictive value.

In this case, a chrominance motion vector that belongs to the same block is calculated to be (0, ½), according to equation (1). If a prediction is made using motion vector (0, ½) as a predictive value of a coding field top field chrominance-pixel 142 in the first line, a pixel position 143 is used as predicted value, which shifts downward by half a pixel from a pixel in the first line of a bottom reference field chrominance component.

In this case, a luminance motion vector (0,1) and a chrominance vector (0,½) are not parallel. It is preferable to use a bottom reference field chrominance predictive pixel position 145 to which a chrominance motion vector parallel to a luminance motion vector is applied.

FIG. 14 shows a conventional problem caused if a chrominance motion vector is calculated using a luminance motion vector when a reference field and a coding field are a top field and a bottom field, respectively. As described in FIG. 13, in FIG. 14, a bottom coding field luminance pixel 150 in the first line has (0,1) as a predictive vector, and as a result, it points a reference top field luminance pixel position 151 in the second line as a predictive value.

In this case, a chrominance motion vector that belongs to the same block is calculated to be (0,½), according to equation (1). If a prediction is made using motion vector (0, ½) as a predictive value of a bottom coding field chrominance pixel 152, a pixel position 153 is used as predicted value which is shifted by half a pixel from a top reference field chrominance pixel position 153 in the first line.

In this case, a luminance motion vector (0,1) and a chrominance vector (0, ½) are not parallel. It is preferable to use a top reference field chrominance predictive pixel position 155 to which a chrominance motion vector parallel to a luminance motion vector is applied.

As described above, if a reference field parity and a coding field parity are different, according to the conventional predictive method, a pixel located in the position of a luminance component spatially deviated from that of the chrominance component is to be referenced, and a predictive image, in which a pixel located in the position of a luminance component is spatially deviated from that of the chrominance component, is generated not only for a zero vector but for all the vectors. Note that, in the above explanation, vector are said to be parallel or not parallel by considering the case where the direction in time of a luminance motion vector and a chrominance motion vector, that is, time direction from coding field to reference field in included in a motion vector. The same is true below.

SUMMARY OF THE INVENTION

It is an object of the present invention to provide a motion picture encoding device and a motion picture decoding device capable of particularly improving predictive efficiency of a chrominance component and improving encoding efficiency accordingly, in encoding between different field images.

The motion picture encoding device of the present invention for making the inter-field motion compensation of a motion picture signal composed of a plurality of fields comprises a plurality of chrominance motion vector generation units generating a chrominance motion vector using a luminance motion vector in a motion picture encoding device; and a selection unit selecting one of the chrominance motion vector generation units used to generate a chrominance vector, using the reference field parity and coding field parity of a motion vector. The chrominance motion vector generation unit selected by the selection unit generates the chrominance predictive vector, based on the motion vector information of luminance information.

The motion picture decoding device of the present invention for making the inter-field motion compensation of a motion picture signal composed of a plurality of fields comprises a plurality of chrominance motion vector generation units generating a chrominance motion vector from a luminance motion vector; and a selection unit selecting one of the chrominance motion vector generation units used to generate a chrominance vector, using the reference field parity and coding field parity of a motion vector. The chrominance motion vector generation unit selected by the selection unit generates the chrominance predictive vector, based on the motion vector information of luminance information.

According to the present invention, since a chrominance motion vector which is generated by a suitable method based on parities of a encoding/decoding field and a reference field, is used, the discrepancy of the chrominance motion vector caused by the difference of arrangement, or the way of assignment to a top and a bottom field of luminance pixels and chrominance pixels, is resolved.

Additionally, by the present invention, a chrominance motion vector which is parallel to a luminance motion vector is obtained even in the case of fields with different parity, and the problem of a shift of reference pixel position between luminance components and chrominance components in the conventional method, is resolved.

BRIEF DESCRIPTION OF THE DRAWINGS

FIG. 16 shows the operation of one preferred embodiment of the first chrominance motion vector generation unit of the present invention.

DESCRIPTION OF THE PREFERRED EMBODIMENTS

Figure 1:
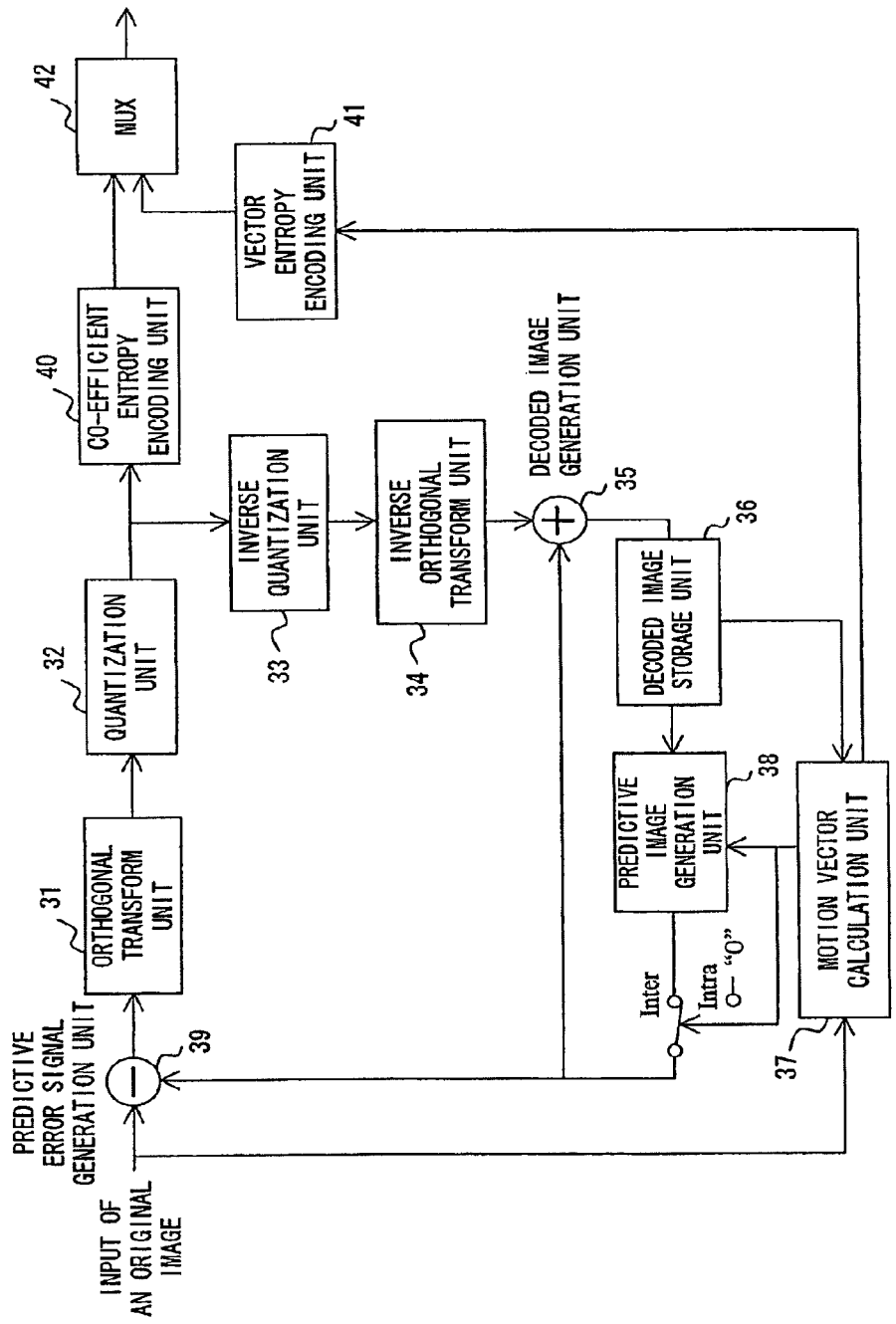
FIG. 1 shows the configuration of an inter-frame predictive encoding device.
Figure 2:
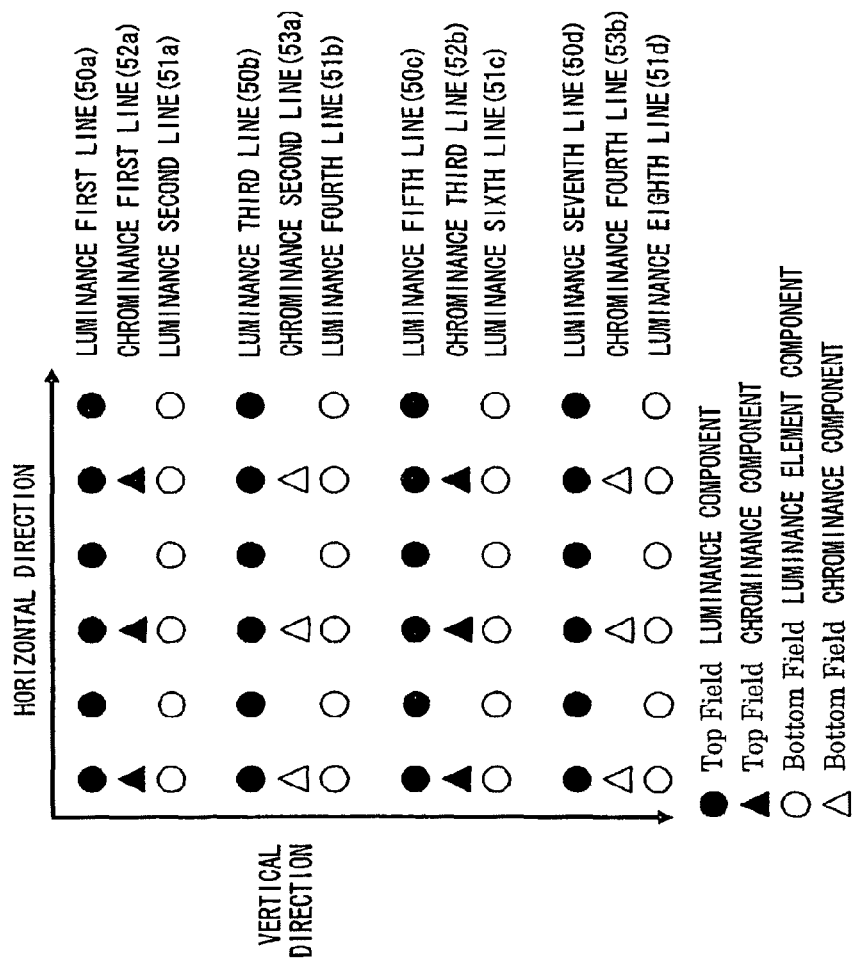
FIG. 2 shows the respective positions of luminance and chrominance pixels and a field to which each of them belongs.
Figure 3:
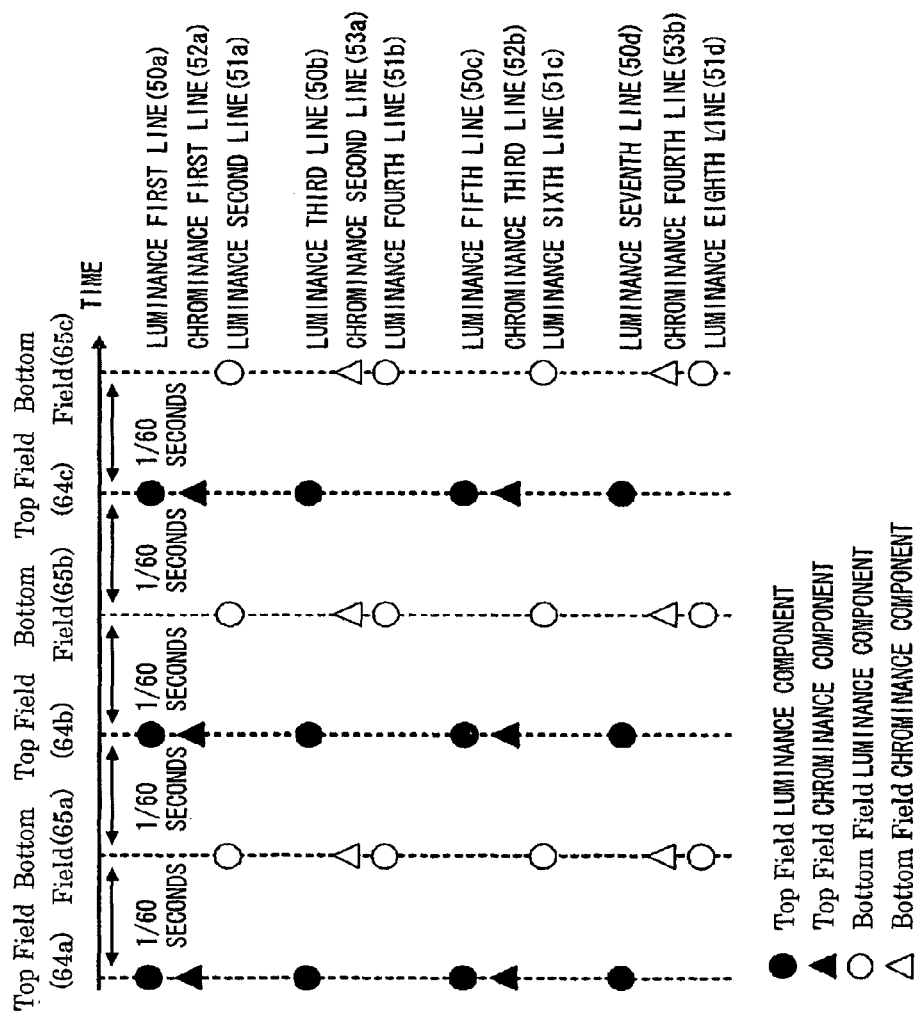
FIG. 3 shows the respective vertical time and spatial positions of luminance and chrominance pixels in a field image.
Figure 4:
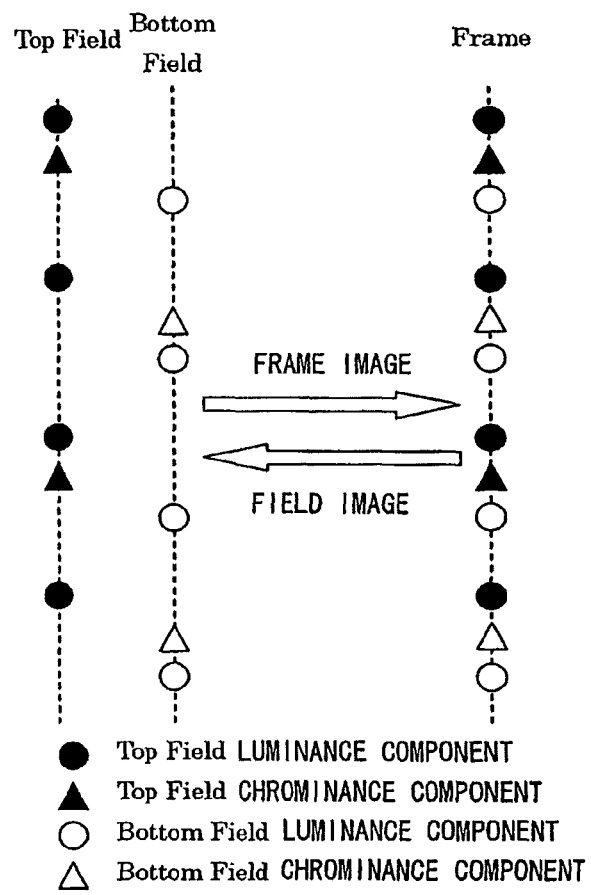
FIG. 4 shows the relation between a field and a frame in a frame encoding mode.
Figure 5:
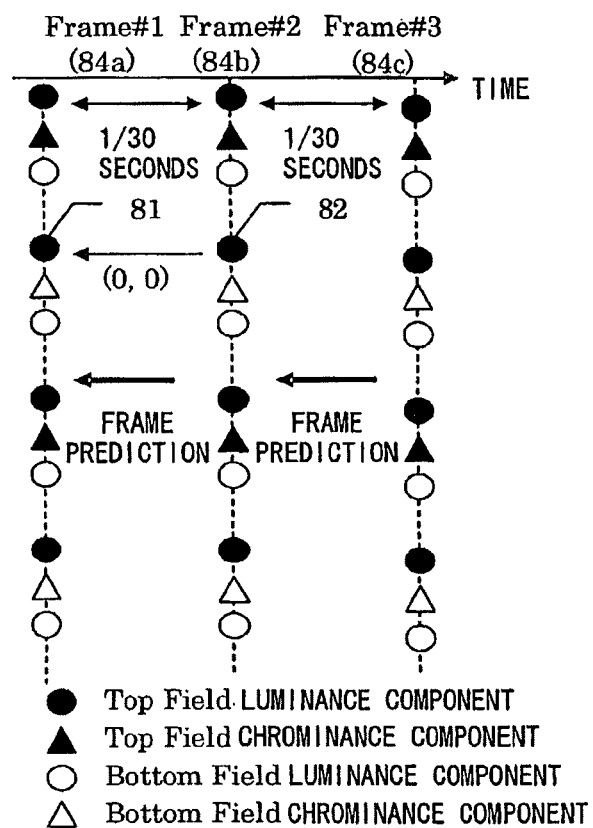
FIG. 5 shows a predictive method in an inter-frame predictive encoding mode.
Figure 6:
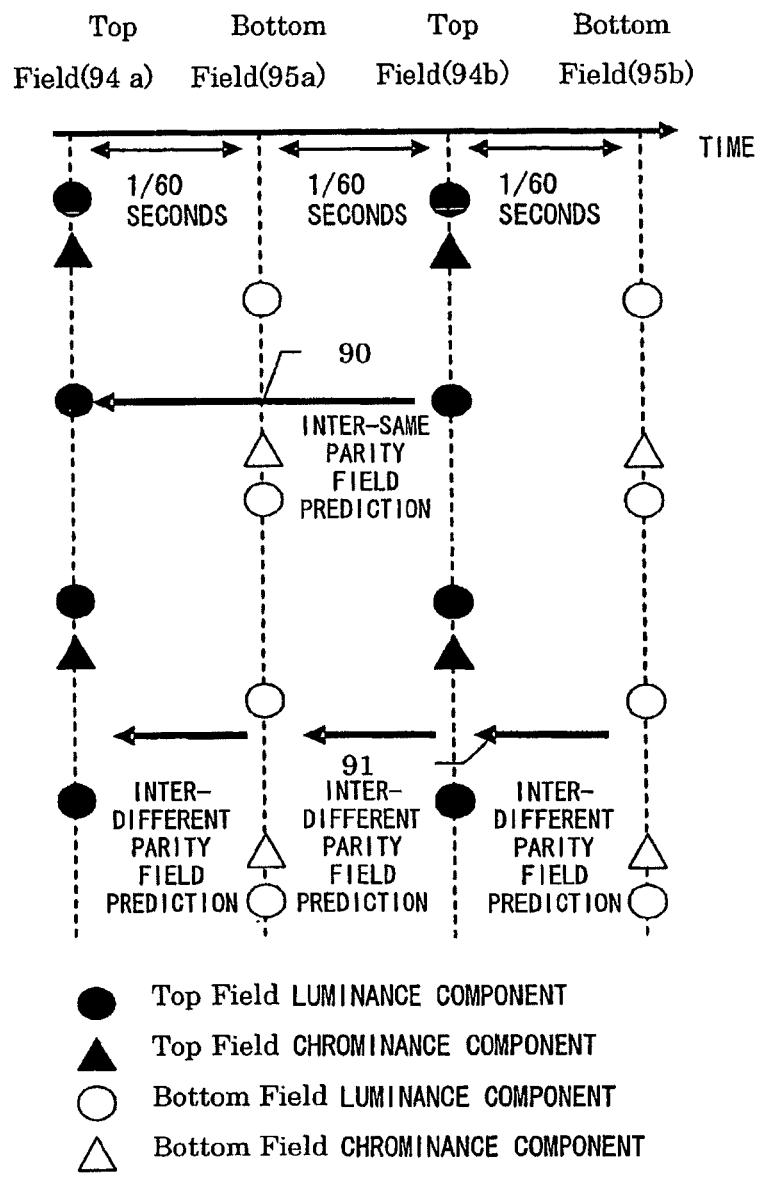
FIG. 6 shows a predictive method in an inter-field predictive mode.
Figure 7:
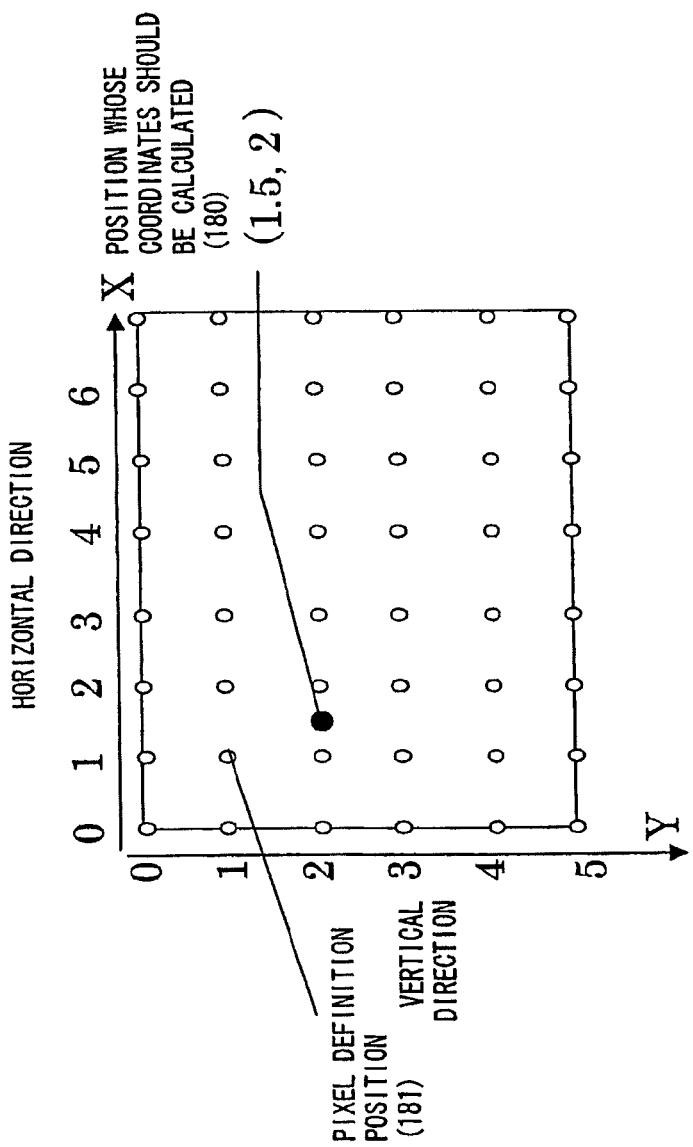
FIG. 7 shows the coordinates of a field image.
Figure 8:
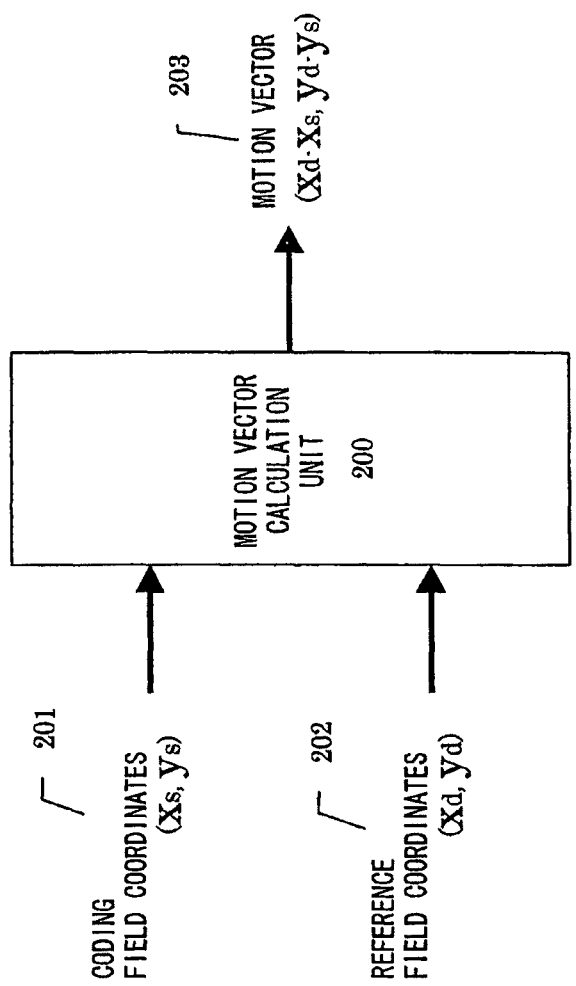
FIG. 8 shows the conventional calculation method of a motion vector between corresponding pixels between fields.
Figure 9:
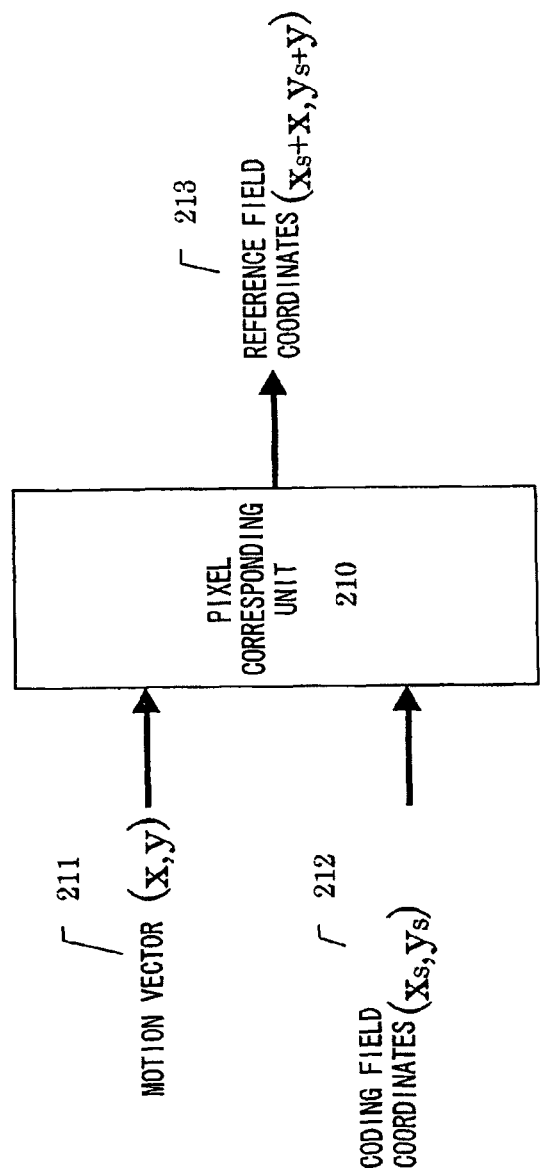
FIG. 9 shows the conventional calculation method of a pixel pointed by a motion vector.

Firstly, the principle of coding in the present invention is described.

The motion picture encoding device of the present invention for making the inter-field motion compensation of a motion picture signal composed of a plurality of fields comprises a plurality of chrominance motion vector generation units generating a chrominance motion vector using a luminance motion vector; and a selection unit selecting one of the chrominance motion vector generation units used to generate a chrominance vector, using the respective parity of the reference field and a coding field of a motion vector. The chrominance motion vector generation unit selected by the selection unit generates the chrominance predictive vector, based on the motion vector information of luminance information.

If a chrominance motion vector from a coding field to a reference field is parallel to a luminance motion vector from the coding field to the reference field, the spatial shift of the luminance motion vector and that of the chrominance motion vector become the same, that is, the relation of the spatial positions of the luminance motion vector and the chrominance motion vector is preserved, then the color displacement between fields disappears.

Here, the important thing is that, in conventional method, even if the luminance motion vector is parallel to the chrominance motion vector based on a mathematical expression, each does not become parallel when those vectors are mapped on relations between luminance pixels and between chrominance pixels which compose each field.

The plurality of chrominance motion vector generation units include the three following types.

A first chrominance motion vector generation unit is selected by the selection unit when a reference field and a coding field have the same parity. A second chrominance motion vector generation unit is selected by the selection unit when a reference field and a coding field are a top field and a bottom field, respectively. A third chrominance motion vector generation unit is selected by the selection unit when a reference field and a coding field are a bottom field and a top field, respectively.

A method for calculating a chrominance motion vector parallel to a luminance motion vector depends on the coding field parity and reference field parity of a luminance motion vector. The calculation method differs in the following three case: a case where the coding field parity and reference field parity are the same, a case where the coding field and reference field are top and bottom fields, respectively, and a case where the coding field and reference field are bottom and top fields, respectively. Therefore, in the present invention, an optimal one is selected from the three types of chrominance motion vector generation units calculating a chrominance motion vector parallel to a luminance motion vector, depending on the coding field and the reference field, and a chrominance motion vector is generated.

Specifically, if the reference field parity and coding field parity are the same, the first chrominance motion vector generation unit calculates a chrominance motion vector as follows, assuming that a luminance motion vector indicating the vertical displacement of one luminance pixel of a field image by the value "1" of the vector component as units and a chrominance motion vector indicating the vertical displacement of one chrominance pixel of a field image by the value "1" of the vector component as units are MVy and MVCy, respectively.

$$MVCy = Mvy/2 \quad (3)$$

If the reference field parity and coding field parity are top and bottom fields, respectively, the second chrominance motion vector generation unit calculates a chrominance motion vector as follows, assuming that a luminance motion vector indicating the vertical displacement of one luminance pixel of a field image by the value "1" of the vector component as units and a chrominance motion vector indicating the vertical displacement of one chrominance pixel of a field image by the value "1" of the vector component as units are MVy and MVCy, respectively.

$$MVCy = Mvy/2 + 0.25 \quad (4)$$

If the reference field parity and coding field parity are bottom and top fields, respectively, the third chrominance motion vector generation unit calculates a chrominance motion vector as follows, assuming that a luminance motion vector indicating the vertical displacement of one luminance pixel of a field image by the value "1" of the vector component as units and a chrominance motion vector indicating the vertical displacement of one chrominance pixel of a field image by the value "1" of the vector component as units are MVy and MVCy, respectively.

$$MVCy = Mvy/2 - 0.25 \quad (5)$$

Sometimes, the respective units of luminance and chrominance vectors vary, depending on its definition. In the case that it is defined that a luminance motion vector indicates the displacement of one luminance moving pixel when the component of the luminance motion vector changes by value 4 and that a chrominance motion vector indicates the displacement of one chrominance moving pixel when the component of the chrominance motion vector changes by value 8, if the reference field parity and coding field parity are the same, the first chrominance motion vector generation unit calculates a chrominance motion vector as follows, assuming that a luminance motion vector and a chrominance motion vector are MVy and MVCy, respectively.

$$MVCy = Mvy \quad (6)$$

In the same definition, if the parity of reference field and coding field are top and bottom fields, respectively, the second chrominance motion vector generation unit calculates a chrominance motion vector as follows, assuming that a luminance motion vector and a chrominance motion vector are MVy and MVCy, respectively.

$$MVCy = Mvy + 2 \quad (7)$$

In the same definition, if the reference field parity and coding field parity are bottom and top fields, respectively, the third chrominance motion vector generation unit calculates a chrominance motion vector as follows, assuming that a luminance motion vector and a chrominance motion vector are MVy and MVCy, respectively.

$$MVCy = Mvy - 2 \quad (8)$$

The motion picture decoding device of the present invention basically has the same functions as the motion picture encoding device, and operates in the same way.

The preferred embodiments of the encoding device are mainly described below. The encoding device has the configuration described above. Since the present invention relates to the vertical component of a motion vector, it is assumed for convenience sake that the horizontal components of all the motion vectors are 0. In this case, the decoding device has the same configuration as the encoding device.

Preferred embodiments are described below assuming that AVC FCD is adopted.

Figure 15:
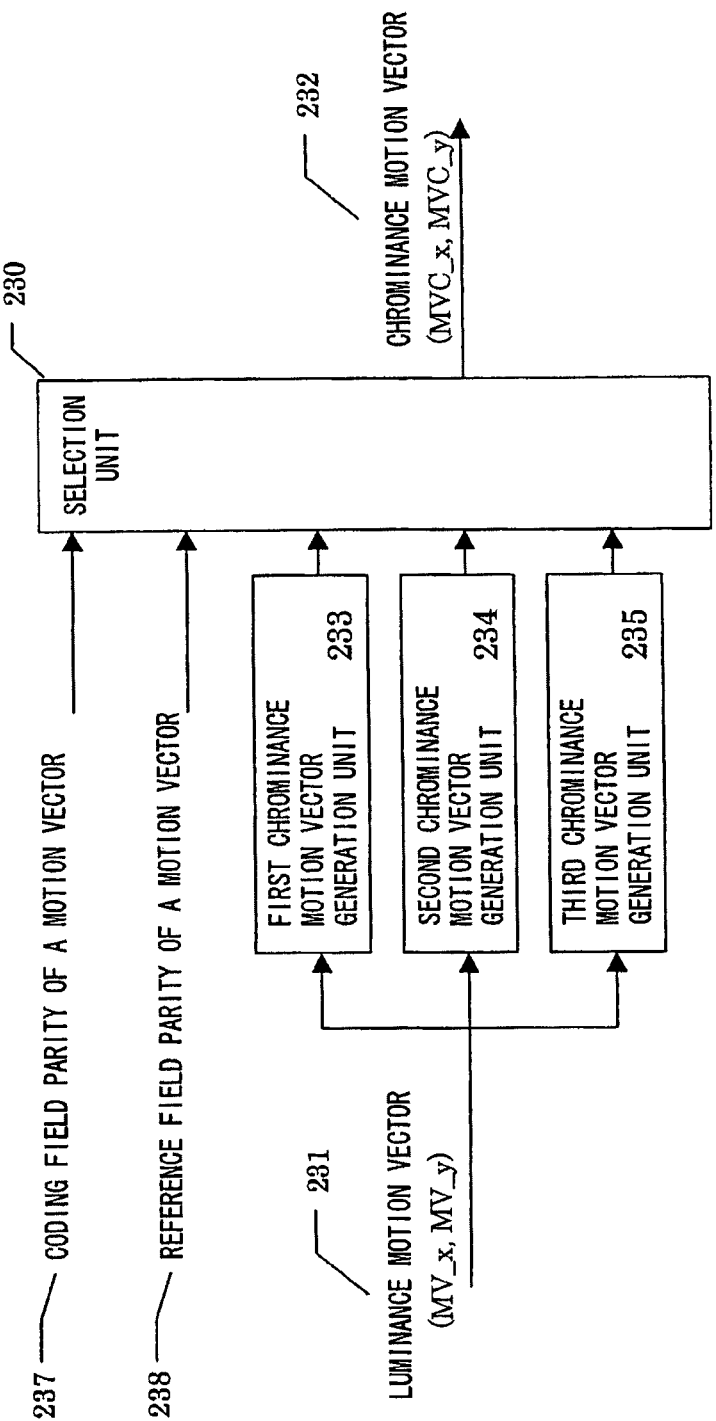
FIG. 15 shows the method for generating a chrominance motion vector, using a luminance motion vector in the present invention.

FIG. 15 shows a method for calculating a chrominance motion vector using a luminance motion vector. The preferred embodiment of a device generating a chrominance motion vector using a luminance motion vector in a field prediction comprises three types of chrominance motion vector generation units and one selection unit.

The operation of the present invention shown in FIG. 15 is described below. Firstly it is assumed that a given luminance motion vector 231 is (MV_x,MV_y). This luminance vector is inputted to all of a first chrominance motion vector generation unit 233, a second chrominance motion vector generation unit 234 and a third chrominance motion vector generation unit 235. Then, their respective outputs are inputted to a selection unit 230. The selection unit 230 selects one of the respective outputs of the first, second and third chrominance motion vector generation units, based on information about the coding field parity 237 of the inputted motion vector and its reference field parity 238, and outputs it as a color motion vector 232 (MVC_x,MVC_y).

FIG. 16 shows the operation of the first chrominance motion vector generation unit. In this preferred embodiment, a luminance motion vector 261 (MV_x,MV_y) is inputted to a first chrominance motion vector generation unit 260, and a first chrominance motion vector candidate 262 (MVC1_x, MVC1_y) is outputted. The chrominance motion vector generation unit 260 calculates the first chrominance motion vector candidate 262 as follows using the luminance motion vector 261.

$$(MVC1\_x, MVC1\_y) = (MV\_x/2, MV\_y/2) \quad (9)$$

Then, the calculated first chrominance motion vector candidate 262 is outputted to the selection unit.

Figure 17:
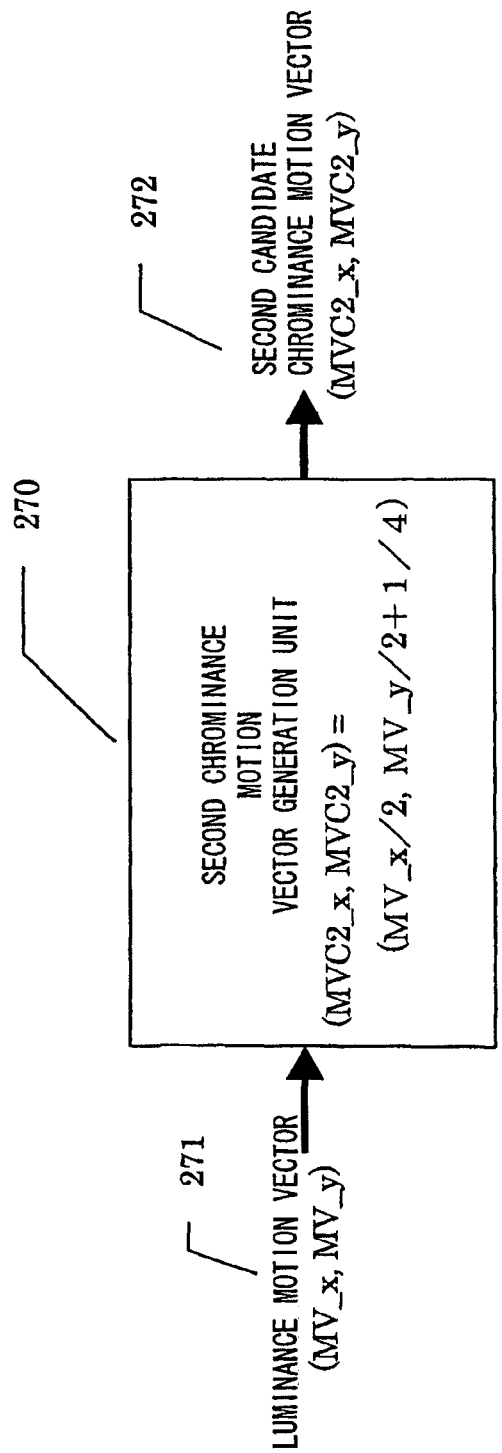
FIG. 17 shows the operation of one preferred embodiment of the second chrominance motion vector generation unit of the present invention.

FIG. 17 shows the operation of the second chrominance motion vector generation unit. In this preferred embodiment, a luminance motion vector 271 (MV_x,MV_y) is inputted to a second chrominance motion vector generation unit 270, and a second chrominance motion vector candidate 272 (MVC2_x, MVC2_y) is outputted. The chrominance motion vector generation unit 270 calculates the second chrominance motion vector candidate 272 as follows using the luminance motion vector 271.

$$(MVC2\_x, MVC2\_y) = (MV\_x/2, MV\_y/2 + 1/4) \quad (10)$$

Then, the calculated second chrominance motion vector candidate 272 is outputted to the selection unit.

Figure 18:
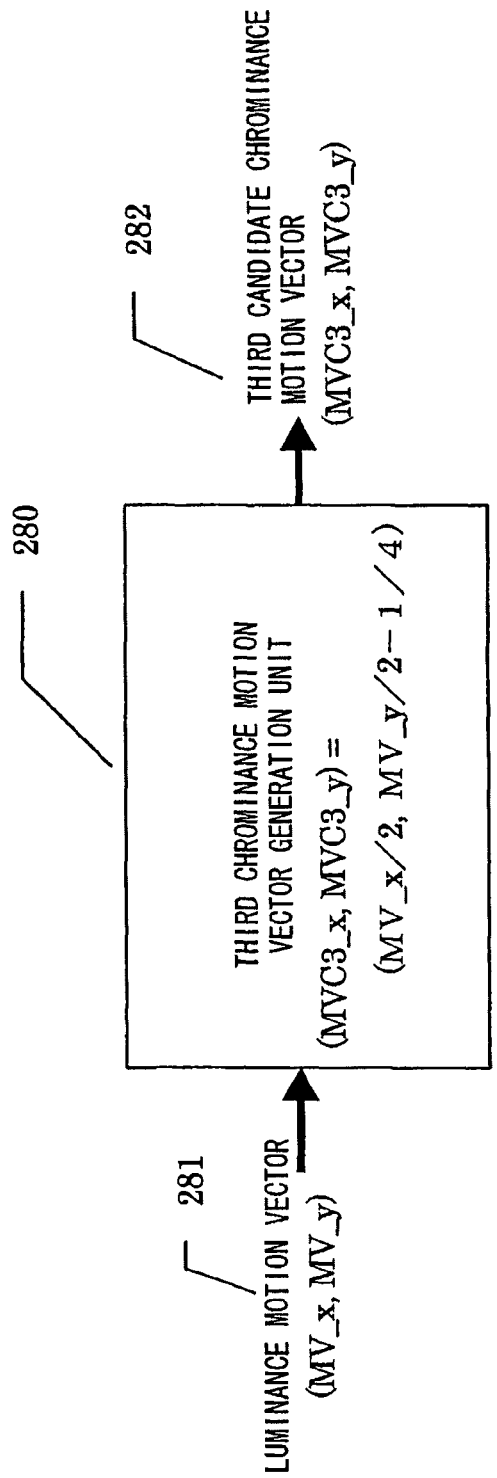
FIG. 18 is the operation of one preferred embodiment of the third chrominance motion vector generation unit of the present invention.

FIG. 18 shows the operation of the third chrominance motion vector generation unit. In this preferred embodiment, a luminance motion vector 281 (MV_x,MV_y) is inputted to a third chrominance motion vector generation unit 280, and a third chrominance motion vector candidate 282 (MVC2_x, MVC2_y) is outputted. The chrominance motion vector generation unit 280 calculates the third chrominance motion vector candidate 282 as follows using the luminance motion vector 281.

$$(MVC3\_x, MVC3\_y) = (MV\_x/2, MV\_y/2 - 1/4) \quad (11)$$

Then, the calculated third chrominance motion vector candidate 282 is outputted to the selection unit.

Figure 19:
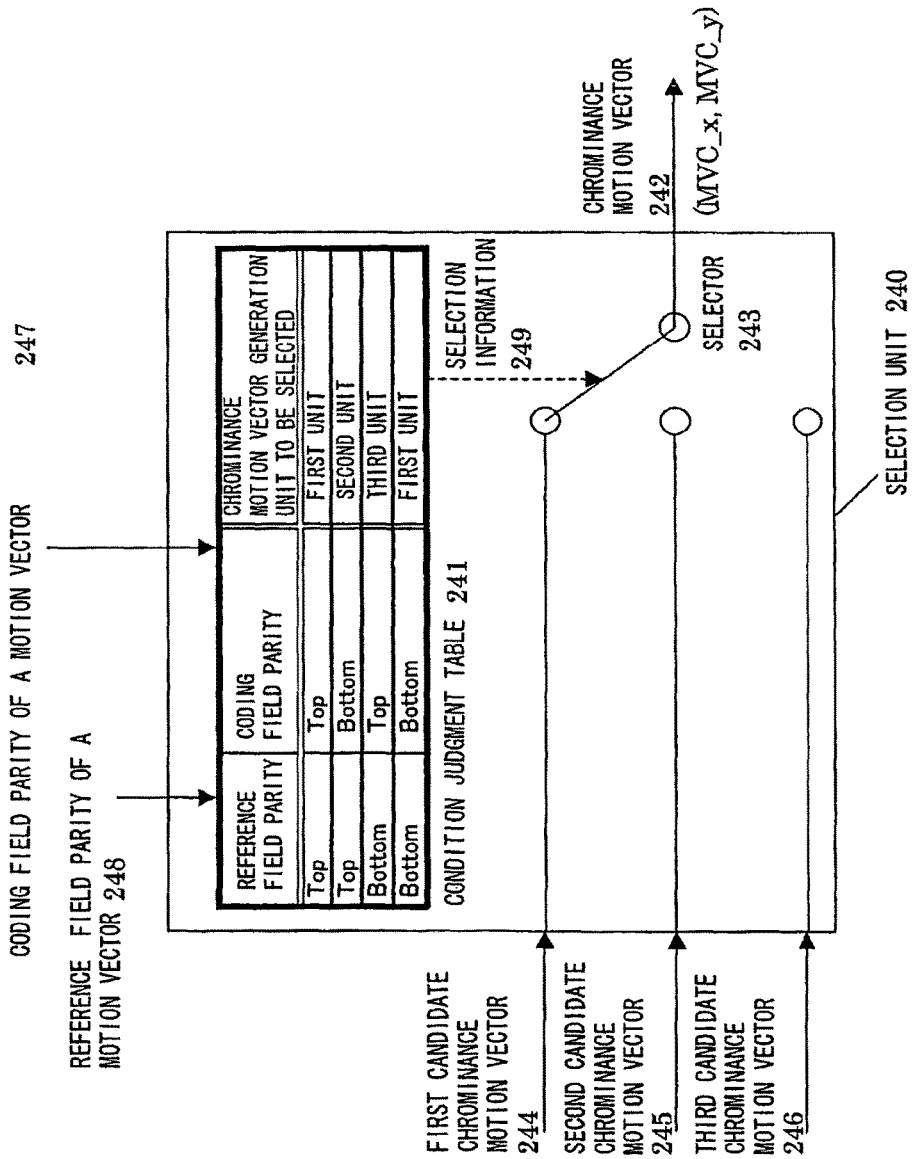
FIG. 19 is the operation of one preferred embodiment of the selection unit of the present invention.

FIG. 19 shows the operation of one preferred embodiment of the selection unit 240 of the present invention. Firstly, in this preferred embodiment, a condition judgment table 241 is used for judgment of the coding field parity 247 of a motion vector and its reference field parity 248, and the selection information 249 of a chrominance motion vector generation unit to be selected is outputted. In this preferred embodiment, if the reference field and coding field are the same, this condition judgment table 241 is used for outputting selection information indicating the selection of a first chrominance motion vector candidate 244. If reference field and coding field are top and bottom fields, respectively, the condition judgment table 241 is used for outputting selection information indicating the selection of a second chrominance motion vector candidate 245. If reference field and coding field are bottom and top fields, respectively, the condition judgment table 241 is used for outputting selection information indicating the selection of a third chrominance motion vector 246 candidate.

In this case, the first, second or third chrominance motion vector candidates 244, 245 and 246 are connected to 262 shown in FIG. 16, 272 shown in FIG. 17 and 282 shown in FIG. 18, respectively. Then, a selector 243 selects one of the first, second and third chrominance motion vector candidates 244, 245 and 246, based on the selection information 249, and outputs (MVC_x,MVC_y) as its chrominance motion vector 242.

Figure 20:
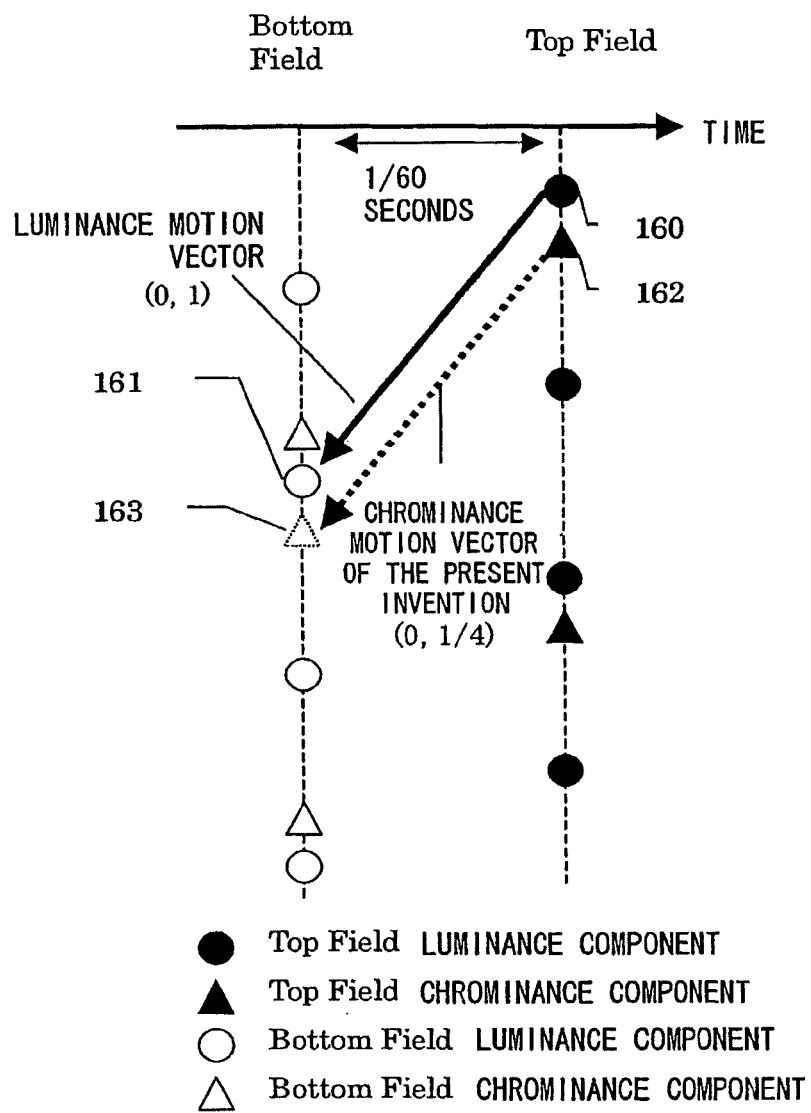
FIG. 20 is one example of the present invention which calculates a chrominance motion vector using a luminance motion vector when a reference field and a coding field are bottom and top fields, respectively.

FIG. 20 shows the operation of the present invention to calculate a chrominance vector using a luminance vector in the case where reference field and coding field are bottom and top fields, respectively. In the example shown in FIG. 20, a luminance motion vector (MV_x,MV_y) used to predict a top coding field pixel 160 is assumed to be (0,1). In this case, a reference field bottom field luminance pixel position 161 is selected for the prediction of a luminance pixel 160. The calculation process of a chrominance motion vector to be used to predict a top coding field chrominance pixel 162 is described below with reference to FIG. 15.

Firstly, in FIG. 20, reference field and coding field are bottom and top fields, respectively. In this case, the condition judgment table 241 shown in FIG. 19 is used for selecting selection information 249 about the third chrominance motion vector candidate. According to equation (11), the third chrominance motion vector candidate is calculated as follows.

$$(MVC3\_x, MVC3\_y) = (MV\_x/2, MV\_y/2 - 1/4) \quad (12)$$
$$= (0/2, 1/2 - 1/4)$$
$$= (0, 1/4)$$

Then, this value is outputted as the chrominance motion vector 242 shown in FIG. 19. If this vector (0,¼) is applied to the top coding field chrominance pixel 162, a bottom reference field chrominance pixel position 163 is used as a predicted value. In FIG. 20, the vertical positional relation between pixels corresponds to a real pixel. As is clear from FIG. 20, a luminance motion vector (0,1) and a chrominance motion vector (0, ¼) are parallel. Thus, the color deviation between luminance and chrominance components, which is a conventional problem, can be solved by the present invention.

Figure 21:
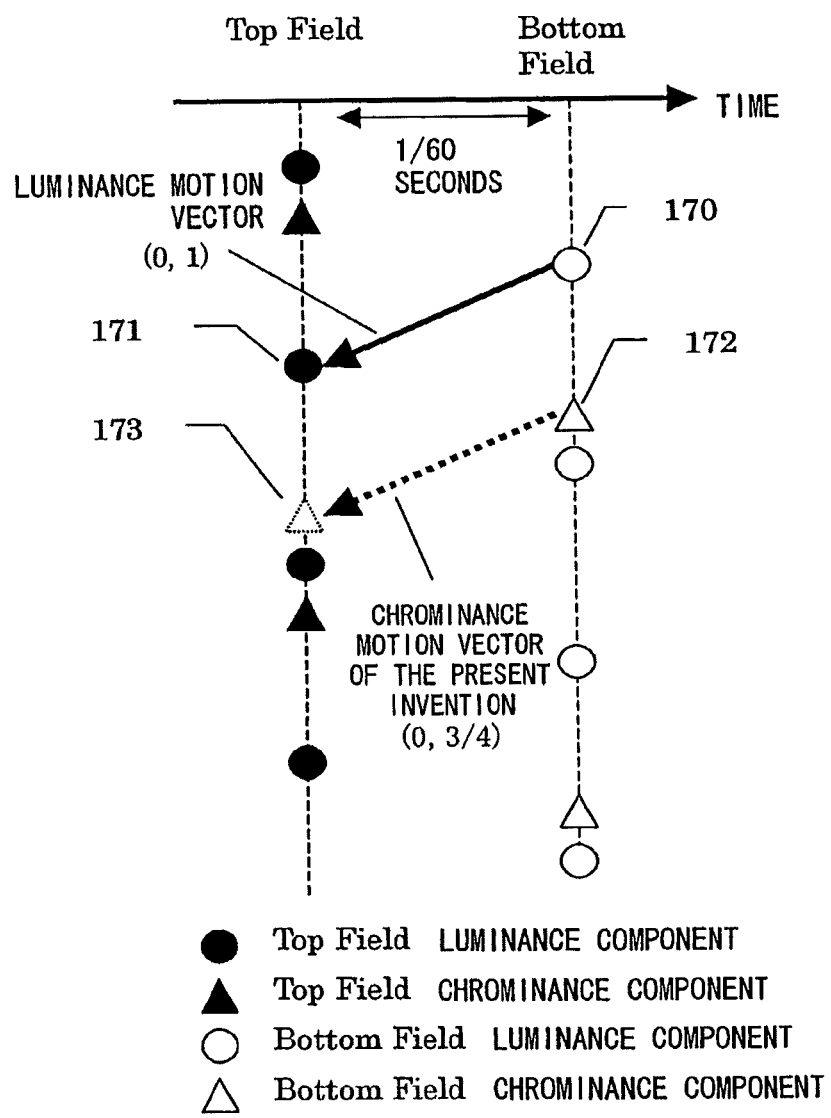
FIG. 21 is one example of the present invention which calculates a chrominance motion vector using a luminance motion vector when a reference field and a coding field are top and bottom fields, respectively.

Similarly, FIG. 21 shows the operation of the present invention to calculate a chrominance vector using a luminance vector in the case where reference field and coding field are top and bottom fields, respectively.

In the example shown in FIG. 21, a luminance motion vector (MV_x,MV_y) used to predict a bottom coding field pixel 170 is assumed to be (0,1). In this case, a top reference field luminance pixel position 171 is selected for the prediction of a luminance pixel 170. The calculation process of a chrominance motion vector to be used to predict a bottom coding field chrominance pixel 172 is described below with reference to FIG. 15.

Firstly, in FIG. 21, reference field and coding field are top and bottom fields, respectively. In this case, the condition judgment table 241 shown in FIG. 19 is used for selecting selection information 249 about the second chrominance motion vector candidate. According to equation (10), the candidate second chrominance motion vector is calculated as follows.

$$(MVC2\_x, MVC2\_y) = (MV\_x/2, MV\_y/2 + 1/4) \quad (13)$$
$$= (0/2, 1/2 + 1/4)$$
$$= (0, 3/4)$$

Then, this value is outputted as the chrominance motion vector 242 shown in FIG. 19. If this vector (0,¾) is applied to the bottom coding field chrominance pixel 172, a top reference field chrominance pixel position 173 is used as a predictive position. In FIG. 21, the vertical positional relation between pixels corresponds to a real one. As is clear from FIG. 21, a luminance motion vector (0,1) and a chrominance motion vector (0, ¾) are parallel. Thus, the color deviation between luminance and chrominance components, which is a conventional problem, can be solved by the present invention.

Although in the examples shown in FIGS. 20 and 21, the prediction of a specific vector is described, in a prediction between other parity fields, a prediction in which there is no deviation between luminance and chrominance can also realized by applying this preferred embodiment.

Figure 10:
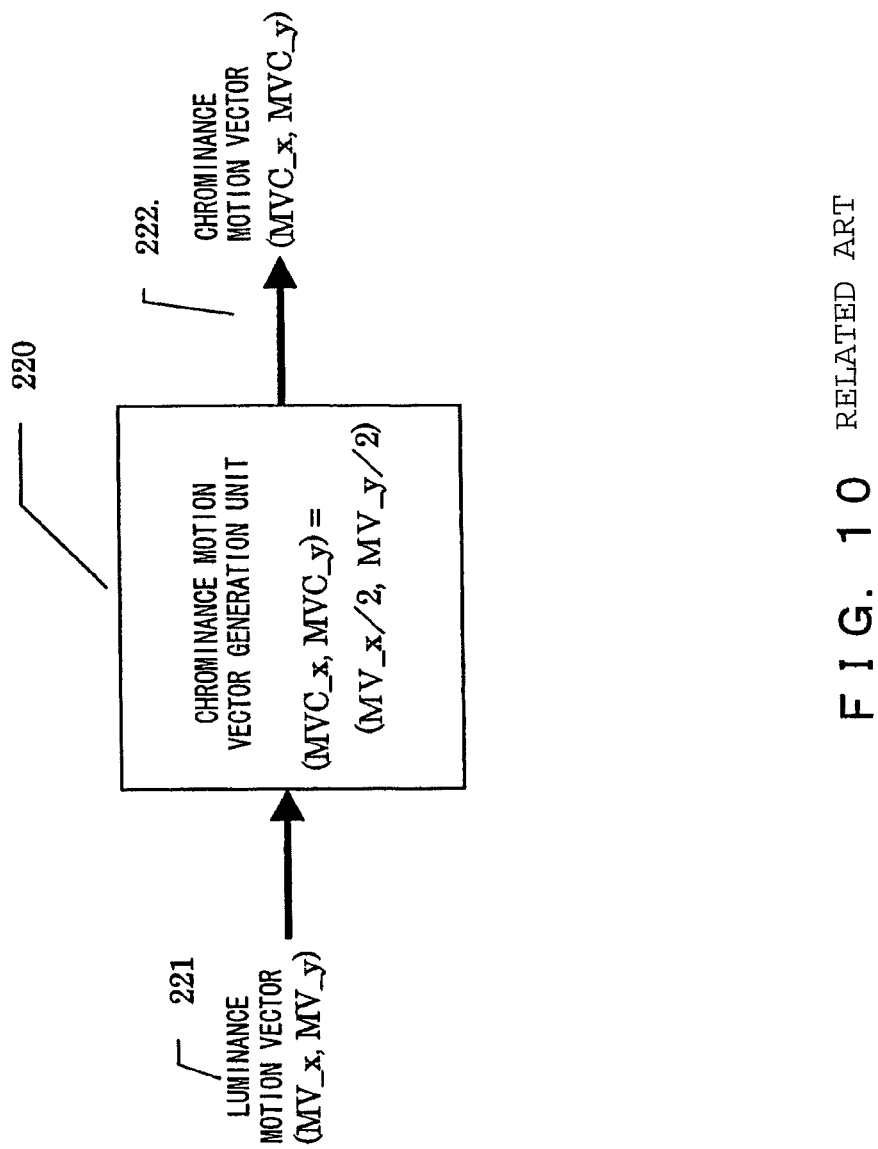
FIG. 10 shows a conventional method for calculating a chrominance motion vector, using a luminance motion vector.
Figure 11:
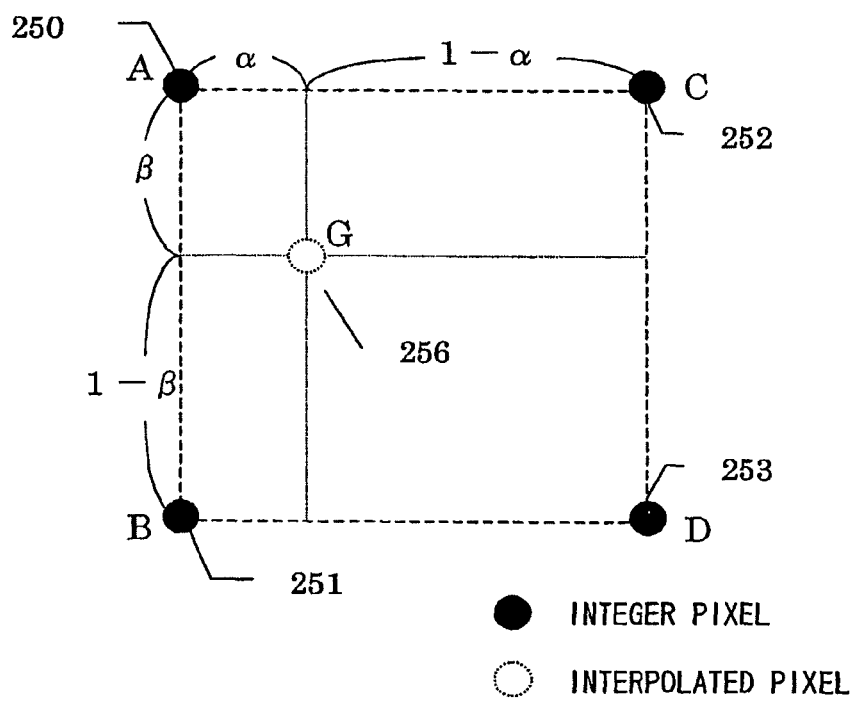
FIG. 11 shows the calculation method of an interpolated pixel of a chrominance component.
Figure 12:
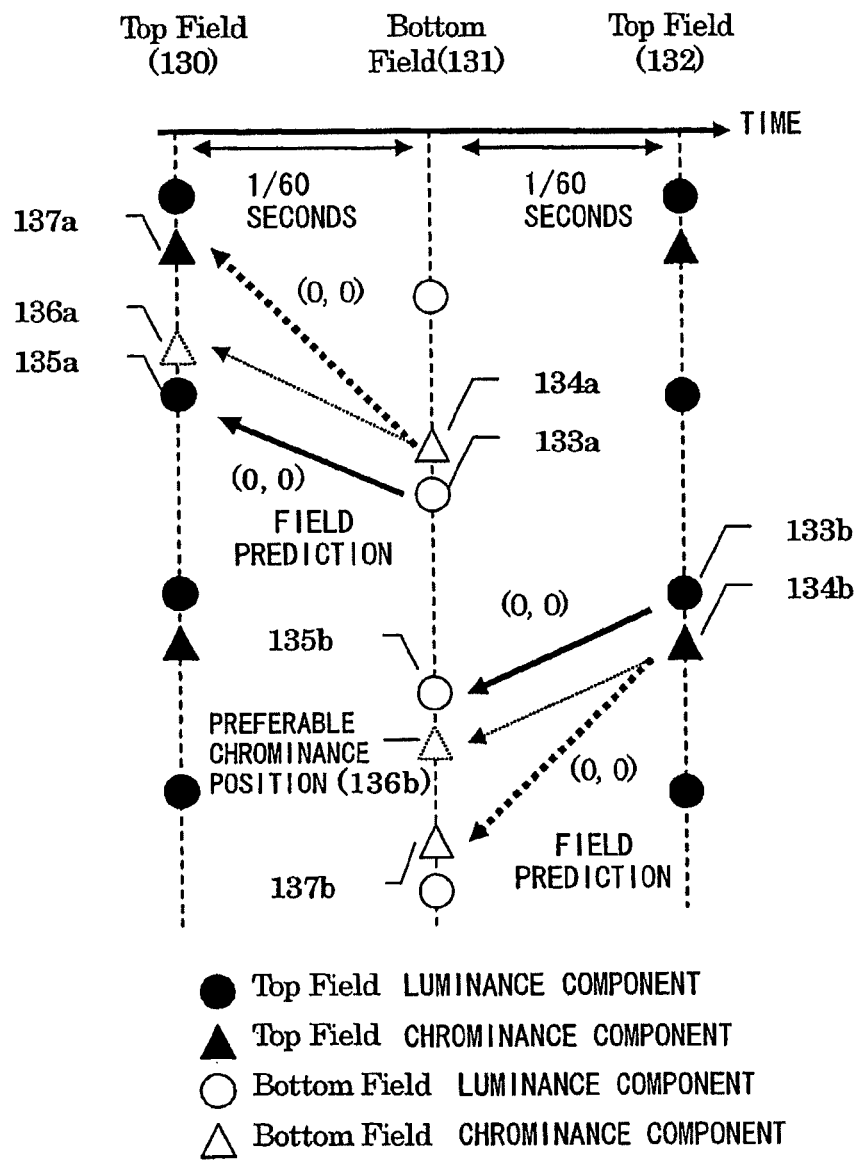
FIG. 12 shows the principle of conventional direct mode for explaining a zero vector between fields with different parity.
Figure 13:
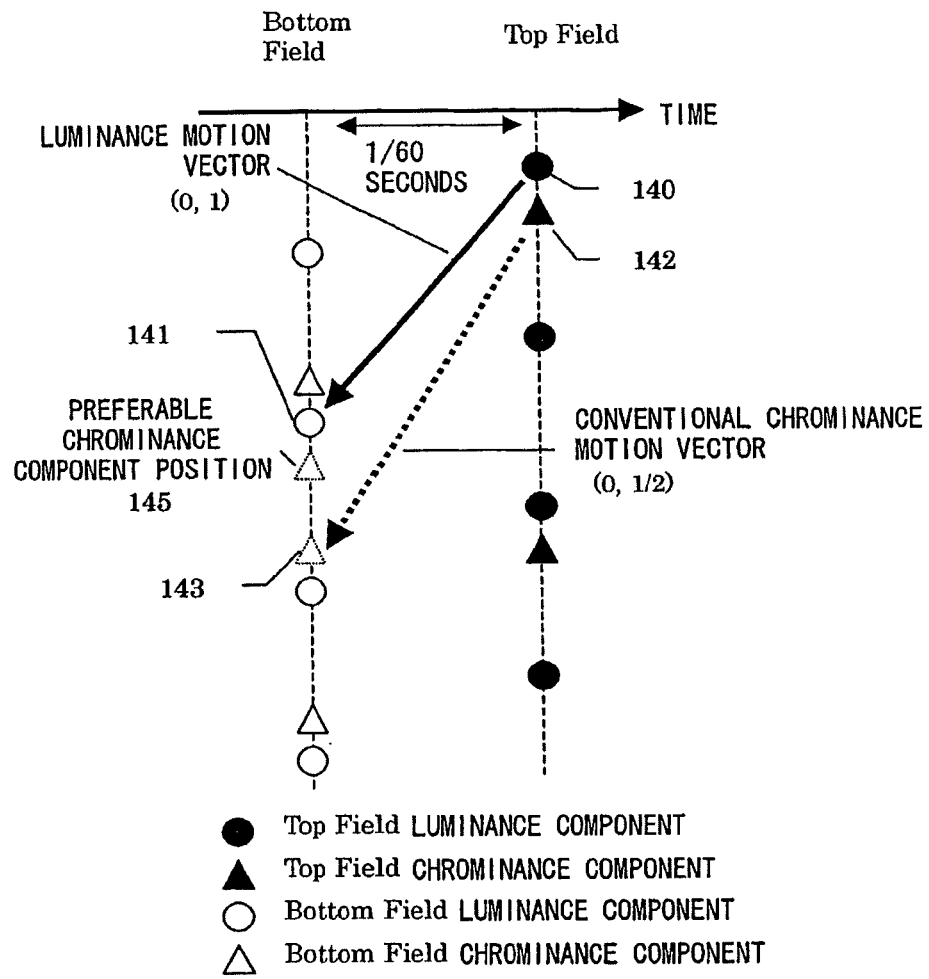
FIG. 13 shows a conventional problem caused if a chrominance motion vector is calculated using a luminance motion vector when a reference field and a coding field are a bottom field and a top field, respectively.
Figure 14:
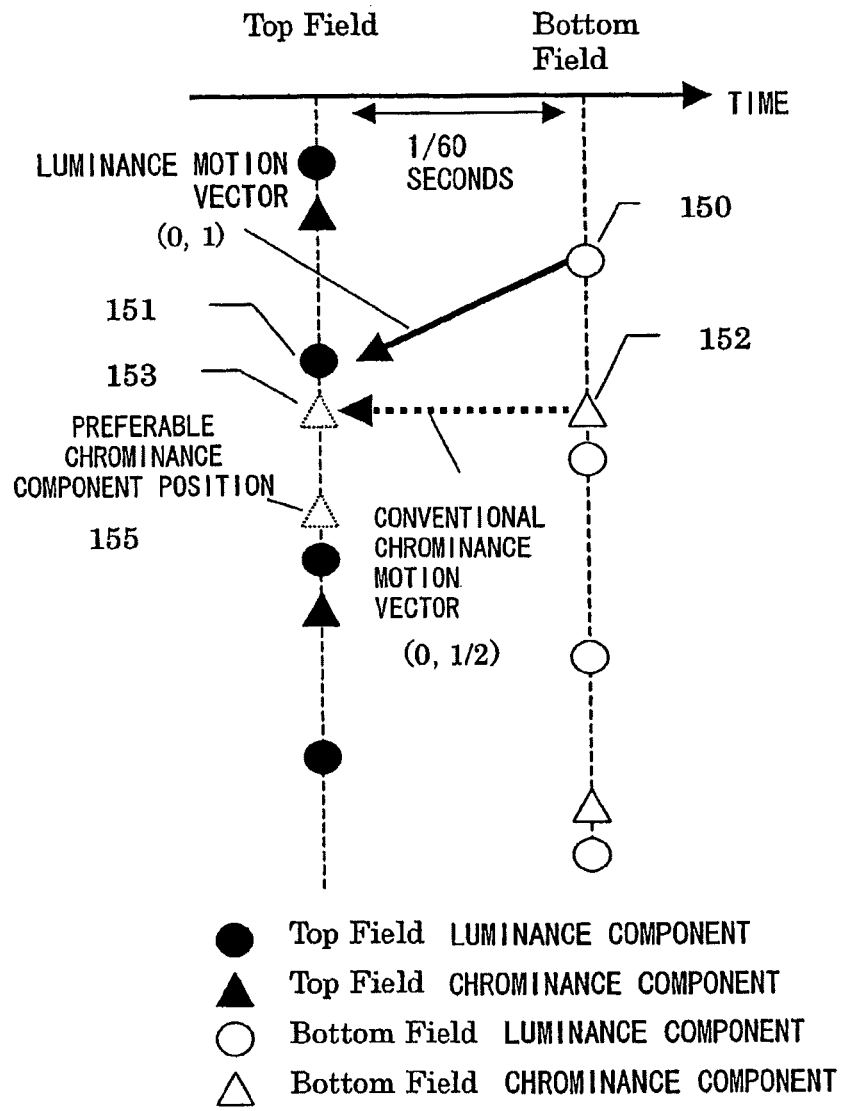
FIG. 14 shows a conventional problem caused if a chrominance motion vector is calculated using a luminance motion vector when a reference field and a coding field are a top field and a bottom field, respectively.

When the reference field parity and coding field parity are the same, such color deviation does not occur. Therefore, the result of the first chrominance motion vector generation unit 233 of the present invention which has the same configuration as a chrominance motion vector generation unit 220 is selected from the conventional luminance motion vector shown in FIG. 10, and is used as a color motion vector 232. Since in this case, a chrominance motion vector calculated by the present invention is the same as conventional one, the description of this preferred embodiment is omitted here.

In another aspect of the present invention, equations (9), (10) and (11) vary depending on the units of luminance and chrominance motion vectors.

Figure 22:
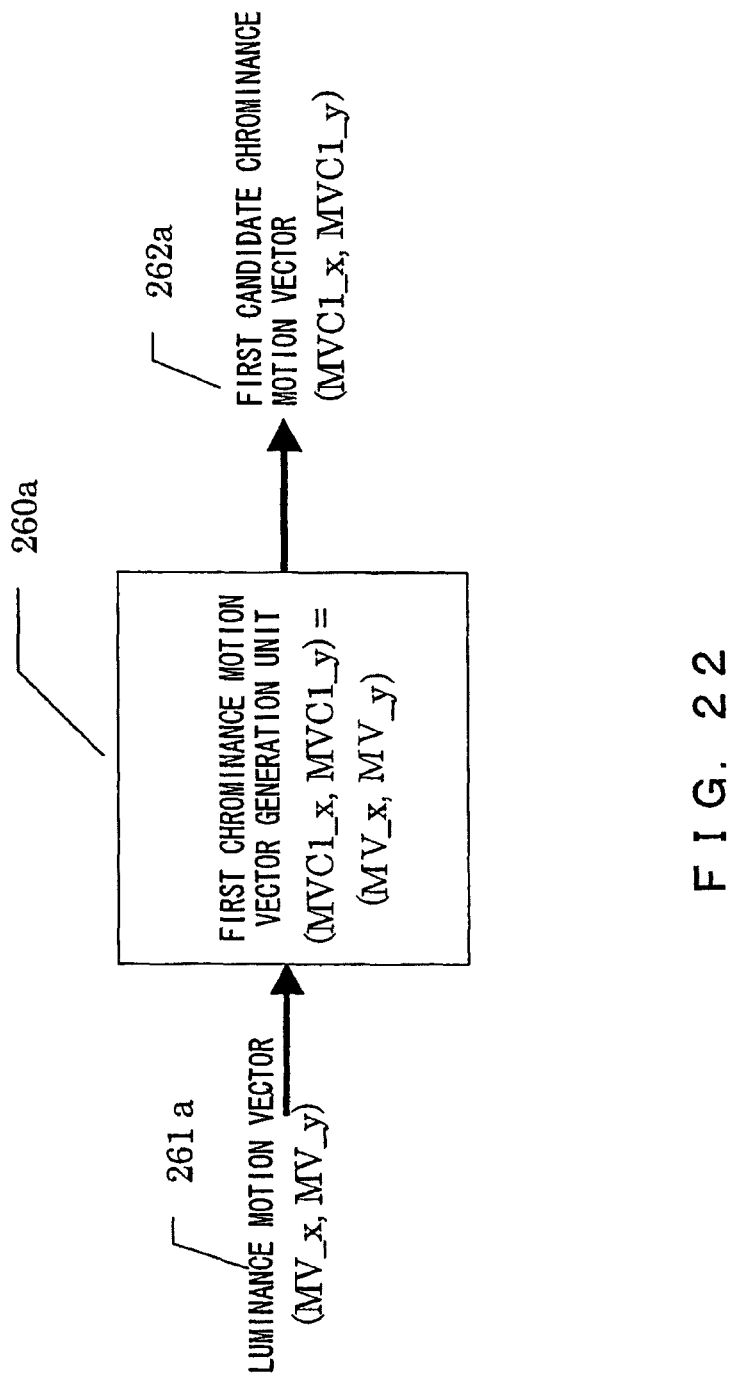
FIG. 22 shows the operation of another preferred embodiment of the first chrominance motion vector generation unit of the present invention.
Figure 23:
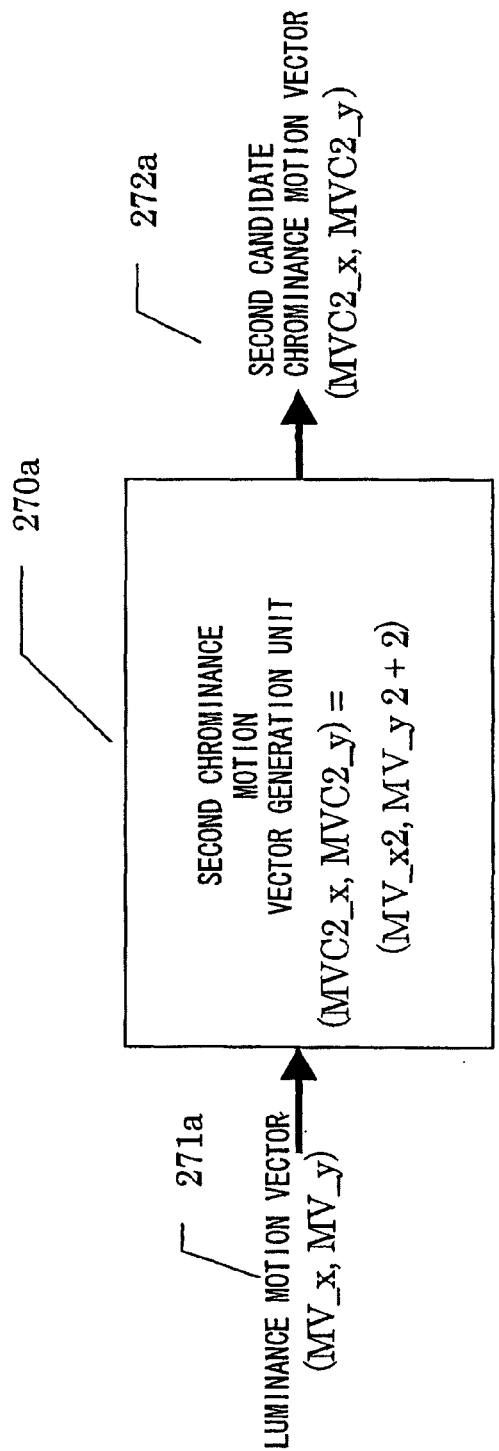
FIG. 23 shows the operation of another preferred embodiment of the second chrominance motion vector generation unit of the present invention.
Figure 24:
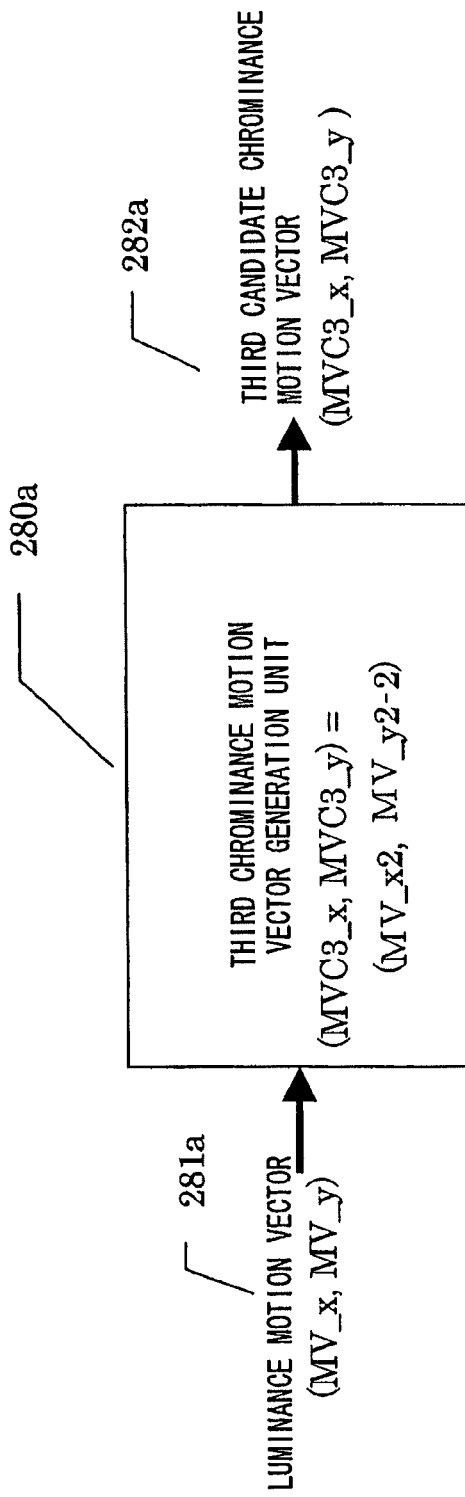
FIG. 24 is the operation of another preferred embodiment of the third chrominance motion vector generation unit of the present invention.

FIGS. 22 through 24 show another embodiment of the first chrominance motion vector generation unit, the second chrominance motion vector generation unit and the third chrominance motion vector generation unit of the present invention.

In the case that it is defined that a luminance motion vector indicates the displacement of one luminance moving pixel when the value of the luminance motion vector changes by four and that a chrominance motion vector indicates the displacement of one chrominance moving pixel when the value of the chrominance motion vector changes by eight, a chrominance motion vector generation unit 260a calculates a candidate first chrominance motion vector 262a using a luminance motion vector 261a as follows.

$$(MVC1\_x, MVC1\_y) = (MV\_x, MV\_y) \quad (14)$$

Then, the calculated first chrominance motion vector candidate 262a is outputted to a selection unit.

The chrominance motion vector generation unit 270a calculates a second chrominance motion vector candidate 272a using a luminance motion vector 271a as follows.

$$(MVC2\_x, MVC2\_y) = (MV\_x, MV\_y+2) \quad (15)$$

Then, the calculated second chrominance motion vector candidate 272a is outputted to a selection unit.

The chrominance motion vector generation unit 280a calculates a third chrominance motion vector candidate 282a using a luminance motion vector 281a as follows.

$$(MVC3\_x, MVC3\_y) = (MV\_x, MV\_y-2) \quad (16)$$

Then, the calculated third chrominance motion vector candidate 282a is outputted to a selection unit.

Although this preferred embodiment is described assuming that it adopts AVC FCD, this is just one preferred embodiment, and the format for encoding a field image is not limited to this.

According to the present invention, a chrominance motion vector parallel to a luminance motion vector can also be calculated in fields with different parity, and the deviation in a reference pixel position between luminance and chrominance components, which are the conventional problem, can be solved accordingly.

The invention claimed is:

1. A motion picture encoding device for making an inter-field motion compensation prediction and for executing an encoding process on a motion picture signal, wherein each frame has two fields and a number of pixels of a chrominance vertical component is different than a number of pixels of a luminance vertical component, the motion picture encoding device comprising:
    an encoder configured to generate a chrominance motion vector from a luminance motion vector based on an equation represented as
    $MVCy=MVy/2+0.25$
    when a reference field is a top field and a coding field is a bottom field, so that the generated chrominance motion vector and the luminance motion vector are thereby parallel,
    wherein MVy represents the luminance motion vector which indicates a vertical direction movement of a luminance pixel of a field image and
    MVCy represents the chrominance motion vector which indicates a vertical direction movement of a chrominance pixel of the field image.

2. The motion picture encoding device according to claim 1, wherein
    the chrominance motion vector is generated from the luminance motion vector based on an equation represented as
    $MVCy=MVy/2$
    when both the reference and coding fields are top fields or are bottom fields.

3. The motion picture encoding device according to claim 2, wherein:
    the encoder adaptively selects a method which uses one of the calculations to generate the chrominance motion vector from the luminance motion vector which depends on parities of the reference field and the coding field.

4. A motion picture encoding device for making an inter-field motion compensation prediction and for executing an encoding process on a motion picture signal, wherein each frame has two fields and a number of pixels of a chrominance vertical component is different than a number of pixels of a luminance vertical component, the motion picture encoding device comprising:
    an encoder configured to generate a chrominance motion vector from a luminance motion vector based on an equation represented as
    $MVCy=MVy/2-0.25$
    when a reference field is a bottom field and a coding field is a top field so that the generated chrominance motion vector and the luminance motion vector are thereby parallel, wherein MVy represents the luminance motion vector which indicates a vertical direction movement of a luminance pixel of a field image, and MVCy represents the chrominance motion vector which indicates a vertical direction movement of a chrominance pixel of the field image.

5. The motion picture encoding device according to claim 4 wherein the chrominance motion vector is generated from the luminance motion vector based on an equation represented as $$MVCy = MVy/2$$

when both the reference and coding fields are top fields or are bottom fields.

6. The motion picture encoding device according to claim 5, wherein the encoder adaptively selects a method which uses one of the calculations to generate the chrominance motion vector from the luminance motion vector which depends on parities of the reference field and the coding field.

7. A motion picture encoding device for making an inter-field motion compensation prediction and for executing an encoding process on a motion picture signal, wherein each frame has two fields and a number of pixels of a chrominance vertical component is different than a number of pixels of a luminance vertical component, the motion picture encoding device comprising:

an encoder configured to determine whether each of a reference field and a coding field is a top field or a bottom field, and configured to generate a chrominance motion vector from a luminance motion vector based on a first calculation when both the reference and coding fields are top fields or are bottom fields, based on a second calculation when the reference field is a top field and the coding field is a bottom field, and based on a third calculation when the reference field is a bottom field and the coding field is a top field.

8. The motion picture encoding device according to claim 7 wherein the first calculation is represented as MVCy=MVy/2, the second calculation is represented as MVCy=Mvy/2+0.25 and the third calculation is represented as MVCy=MVy/2−0.25 wherein MVy represents the luminance motion vector which indicates a vertical direction movement of a luminance pixel of a field image, and MVCy represents the chrominance motion vector which indicates a vertical direction movement of a chrominance pixel of the field image.

9. A motion picture encoding device for making an inter-field motion compensation prediction and for executing an encoding process on a motion picture signal, wherein each frame has two fields and a number of pixels of a chrominance vertical component is different than a number of pixels of a luminance vertical component, the motion picture encoding device comprising:

means for determining whether each of a reference field and a coding field is a top field or a bottom field, and means for generating a chrominance motion vector from a luminance motion vector based on a first calculation when both the reference and coding fields are top fields or are bottom fields, based on a second calculation when the reference field is a top field and the coding field is a bottom field, and based on a third calculation when the reference field is a bottom field and the coding field is a top field.

10. The motion picture encoding device according to claim 9 wherein the first calculation is represented as MVCy=MVy/2, the second calculation is represented as MVCy=Mvy/2+0.25 and the third calculation is represented as MVCy=MVy/2−0.25 wherein MVy represents the luminance motion vector which indicates a vertical direction movement of a luminance pixel of a field image, and MVCy represents the chrominance motion vector which indicates a vertical direction movement of a chrominance pixel of the field image.

* * * * *